United States Patent [19]
Hayes, Jr.

[11] Patent Number: 6,108,712
[45] Date of Patent: Aug. 22, 2000

[54] CLIENT-SERVER SYSTEM WITH CENTRAL APPLICATION MANAGEMENT AND PROVIDING EXPORT AGENT CAPABILITY FOR RETROFITTING EXISTING HARDWARE AND APPLICATIONS INTO THE SYSTEM

[75] Inventor: Kent Fillmore Hayes, Jr., Chapel Hill, N.C.

[73] Assignee: International Business Machines Corp., Armonk, N.Y.

[21] Appl. No.: 09/073,166

[22] Filed: May 5, 1998

[51] Int. Cl.$^7$ ............................ G06F 15/16; G06F 15/167
[52] U.S. Cl. ........................... 709/246; 709/212; 709/216; 709/218; 709/219
[58] Field of Search ................................... 709/246, 212, 709/216, 218, 219, 104, 203; 395/500.44; 370/352

[56] References Cited

U.S. PATENT DOCUMENTS

| | | | |
|---|---|---|---|
| 4,885,770 | 12/1989 | Croll | 379/269 |
| 5,440,744 | 8/1995 | Jacobson et al. | 709/203 |
| 5,442,749 | 8/1995 | Northcutt et al. | 709/219 |
| 5,442,791 | 8/1995 | Wrabetz et al. | 709/104 |
| 5,588,148 | 12/1996 | Landis et al. | 707/1 |
| 5,754,830 | 5/1998 | Butts et al. | 395/500.44 |
| 5,867,495 | 2/1999 | Elliott et al. | 370/352 |

OTHER PUBLICATIONS http://nf/pdc97/profiles_and_policies.htm "Guide to Microsoft Windows NT 4.0 Profiles and Policies" pp. 1–76.
http://www.ietf.org/html.charters/acap–charter.html "Application Configuration Access Protocol (acap)", 68 pages.
IBM Network Station Manager for Windows NT Server 4.0, Chapter 5. Using the IBM Network Station Manager, pp. 5–1 to 5–15.
http://www.software.ibm.com/os/warp/library/sq202822.htm, "WorkSpace on–Demand Handbook", Chapters 2.3.1; 6.2; 6.3; 6.3.1; 6.3.3; 6.5.
http://www.triteal.com/SoftNC, Java Desktop Environment from Triteal, pp. 1–2.
http://java.sun.com/products/hot–javaviews/admin.html, "HotJava Views", pp. 1–24.
http://esuite.lotus.com/eSuite/eSuite, "The Right Work Environment for Network Centric Computing". 24 Pages.

*Primary Examiner*—Le Hien Luu
*Attorney, Agent, or Firm*—Jerry W. Herndon

[57] ABSTRACT

A system with a network interconnecting a server and a plurality of user stations. The system provides a means whereby vendors of existing hardware and software can integrate the hardware or software into the environment of a centrally managed network computing system, without having to retrofit the hardware with new firmware or without having to redesign the existing software. An export service allows a system administrator to generate configuration files in the format that the existing hardware or software expects and to store the files at the server in a way that the existing hardware or software can access the files in the manner for which it is designed.

4 Claims, 22 Drawing Sheets

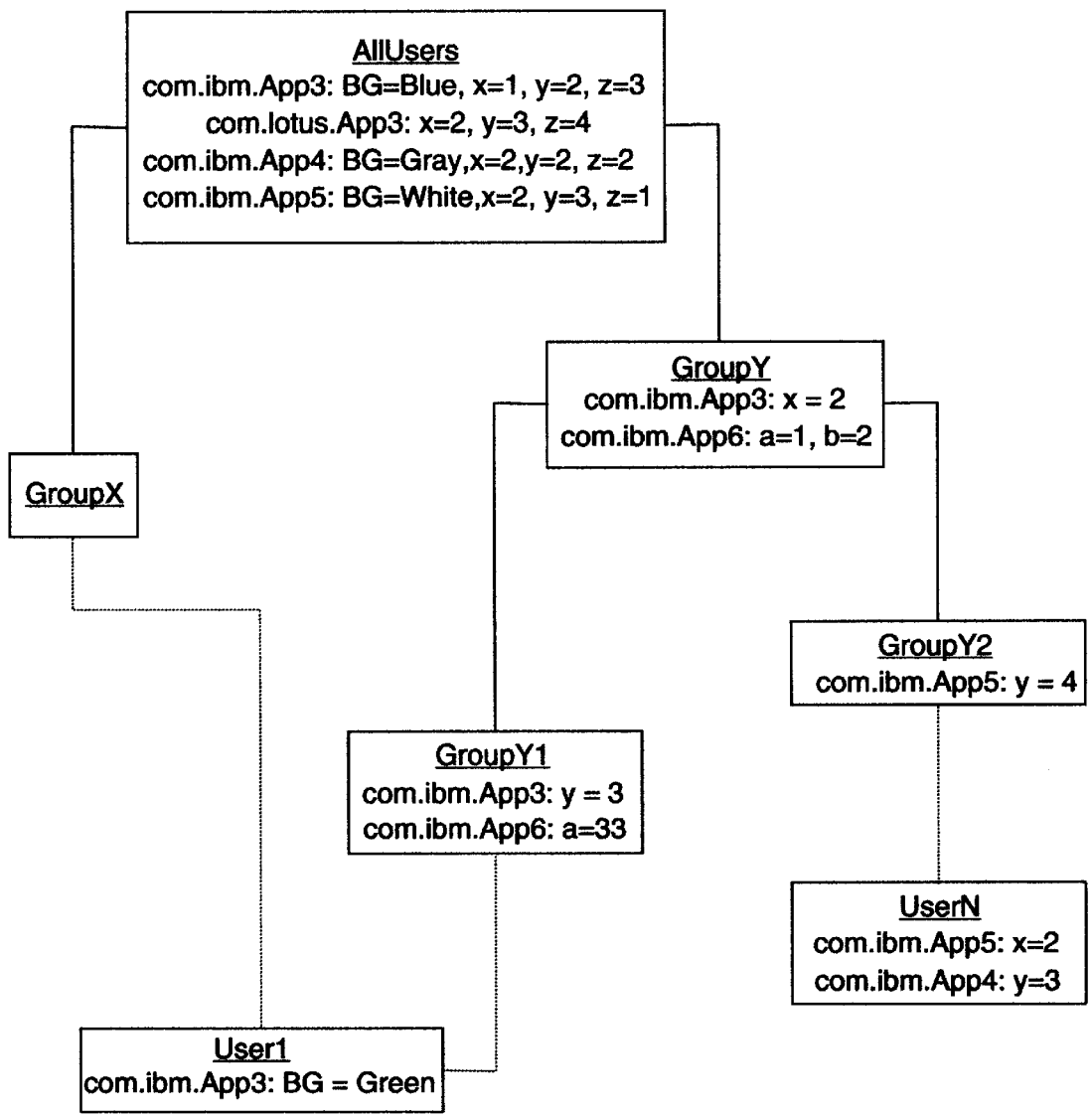

Import Applet List From File

Importing an applet list from a file will cause any pending changes that have not been saved to be lost.

Complete path of file _____

[_____ Import now]

Done...

FIG. 14

CLIENT-SERVER SYSTEM WITH CENTRAL APPLICATION MANAGEMENT AND PROVIDING EXPORT AGENT CAPABILITY FOR RETROFITTING EXISTING HARDWARE AND APPLICATIONS INTO THE SYSTEM

TECHNICAL FIELD

The invention relates generally to the fields of personal computing and networking. Specifically, it relates to the new and evolving field of network computing in which desktop computer users use a personal computer, possibly diskless, connected to a network such as a corporate intranet, the Internet, or to an network or Internet Service Provider (ISP) to gain access to applications which are then executed on the desktop computer. More specifically, the invention relates to server-based storage of software preferences (configuration data) for software retrieved from a server and executing at the desktop computer

BACKGROUND OF THE INVENTION

The field of network computers is presently in its infancy. However, it is expected to evolve rapidly, especially in the corporate environment, for a number of reasons. The expectation is that as companies and possibly individual users reach hardware and software upgrade points, it will be more efficient and less expensive to move to this new field, rather than upgrade in the traditional way with disk equipped computers and locally stored and administered software applications. For example, in the corporate environment, a user can be connected to a corporate intranet, using, for example, the TCP/IP and HTTP protocols of the Internet, and download software applications as they are needed directly from a network server to the desktop computer. An application is executed on the desktop in the traditional manner by the user to perform useful work. An advantage of this configuration is that network computers are substantially less expensive than traditional disk equipped computers. It might also cost less to purchase the required number of software licenses for users, rather than purchase individual copies of software for each user. Certainly, the software administration problems that attend large numbers of corporate users will be substantially reduced. At the present time, each user of a disk equipped computer or workstation often is effectively his or her own system administrator, a role that often consumes excessive resources due to lack of expertise. It is expected to be a great advantage to eliminate this problem by effectively offloading the problem to a small number of server administration experts, rather than having many users struggle with the problems of software installation, upgrades and computer administration.

As mentioned above, this vision of the future of personal computing is presently in its infancy. As a result, there are presently many problems and deficiencies with existing systems.

Typically, in network computer systems, an administrator creates user profiles that are stored on a network server. The profiles may contain different types of information, such as user desktop preferences and user permissions for access to different software applications that might reside on the server. When a user logs onto the system, the user identifies him or herself to the server, the server locates the profile for the user and transmits it to the user computer where it is used to configure the computer and generate a desktop. The desktop might include a number of icons representing applications to which the user presumably has access. The profile likely also contains other attributes of the computer and desktop, such as for example, the background color of the desktop, or character fonts and point sizes used on the desktop, or data file search paths, etc. that are unique to the user. The profiles may be user modifiable or non-modifiable.

In an environment in which users can modify their own profiles, a modified profile is uploaded back to the server at log-off time, where it is stored for retrieval the next time the user logs-on. In some prior art systems, to the best of our knowledge, the users can generate on their desktops any configuration of application icons they wish, whether or not they exist on the server, and whether or not a user actually has access permission to an application on the server. The Lotus Workplace Desktop (previously called Kona Desktop) system is an example of this type of operation. In other systems, the server presents a list to the user of all applications that the server has, from which the user can pick. In this case, there is no guarantee that the user actually has access permission to an application that is selected from the list for inclusion on the desktop. The Sun Hot Java Views system is an example of this type of system. In other words, the prior art systems do not correlate between what the user can configure for the set of desktop application icons and applications to which the user actually has permission access. In such a case, when the user clicks on a icon to execute an application, an error message may occur (such as an unauthorized access message) if access permission is not present, or in a worse case, the user's computer may crash.

Another limitation with existing art is that a flat data structure is used to model users, user groups, terminals and groups of terminals. Modeled after a common scheme for managing user access to computer resources, known network computer implementations (e.g., Lotus Administration Facility for Desktops, Microsoft Windows NT Profiles and Policies, and Sun Hot Java Views) implement a flat "groups" structure on the server for managing software preferences (or attributes) in various contexts. A "context", as used here, refers to an individual user, user group, terminal, or terminal group. Any grouping structure for managing software preferences on the server allows an administrator to define preference attributes for different groups of users as well as for individual users. However, flat systems are inflexible in many environments, especially in environments having large numbers of users. It is desirable to provide an administrative tool supporting the organization of preference information into a hierarchical structure.

Another limitation with existing systems is that they are limited in the ways that administrators and users have to perform user configuration of workstation desktops. For example, administrators are presently required to configure user preferences using configuration programs that are separate from, but associated with, a user application. It is desirable to allow vendors to provide only a single application. To require only an end user application from a vendor necessitates that the central management facility be able to execute the end user application in a context of a user or user group. The prior art does not allow this administrative flexibility of operation. In other words, in the prior art, to the best of our knowledge, an administrator does not have the ability to run a user application in the context of a user to set preferences for that user and application. Further, in the art, an administrator cannot run a user application to set preferences in the context of a group of users.

Still another limitation in the prior art known to the inventors is the manner in which the prior art partitions server permanent storage space to guarantee that a unique space is reserved for storing user preferences related to the different applications on the server. To the knowledge of the inventors, the problem of preventing collisions in the storage of preference information for different applications in object-oriented systems, in which an object can be queried for its fully qualified class name which uniquely identifies and differentiates it from other classes, is solved by having a first central authority assign a unique designation that applies to a vendor and by then having a second authority at the vendor assign a second designation relative to the first designation for each vendor application. For example, vendor A might be assigned the designation vendorA by the first authority and that designation is guaranteed to be unique within the architecture for which the first authority is acting. The second authority at vendor A then assigns the second designation for each of its applications within that architecture. For example, one of vendor A's applications might be designated-vendorA.App1; another might be designated vendorA.App2. The art maps the unique designation for each application in a system to a location in permanent storage of the system to guarantee that preference data for the different applications do not collide in storage. An application, when running, informs the network computer server of its unique storage location and it is the responsibility of the server to partition an area at the starting location according to a context (user, user group, terminal or terminal group) for storing preference information so as not to collide with preference information in a different context. Clearly, this manner of administering storage space is awkward and undesirable. It is desirable to devise a method to automatically generate unique storage locations for storing preference information for the afore mentioned object-oriented applications, without resorting to the requirement of having central authorities assign unique designations for the purpose of preventing collisions in the storage of preference information and without coding storage location information into an application.

Still another limitation in the art lies in the lack of any provision to migrate existing applications and hardware into the new environment of the centrally managed network computing world without requiring changes to the existing hardware and applications. Existing hardware, a terminal for example, in a networked environment, gets its configuration information at boot-up time from a file in a specific format located on a server. The terminal is programmed to know how to access its configuration file. The terminal uses a unique identifier to access the file from the server. The unique identifier is often the media access control (MAC) address of the terminal. However, in a new centrally managed environment involving protocols and API's that are different from that to which the terminal is designed, the terminal cannot access preference information in the new environment, the terminal can only access its configuration file in the way for which it is designed. This is a serious problem, because there are many such existing devices in use. The inability to use them in new systems impedes substantially the incentives for users to migrate to the new systems.

Still another limitation in the prior art concerns the interface between an administrator and the configuration management system. When configuring software within an administration facility to configure preference information for various users and user groups, and terminals and terminal groups, the administration software launches in the context (user, user group, terminal or terminal group) set by the Administrator who is running the facility. When the Administrator changes the context that the application is running under, the application needs to be relaunched to load configuration information for the new context. The process of relaunching software each time a context is changed is time consuming and inconvenient for an administrator, especially in systems with many users. In such systems, it is expected that an administrator will change contexts many times while configuring an application.

The system described herein provides a common repository for configuration information for users and applets in a client-server environment. This is referred to as client profile management. The system allows users to roam, that is, to log-in from any computer in the system at any time and have it configured automatically at run time according to the preferences stored for the user at the server. The preferred embodiment is a Java (Java is a Trademark of Sun, Inc.) based system and the client computers use a web browser interface arranged to execute Java applications. Thus, in the preferred embodiment, user applets and the desktop applet are assumed to be Java applets. However, it is not intended to limit the invention to a Java environment. Preferences for the locally stored applications might be stored locally in the traditional manner, while preferences for the server-based applets might be handled in the way described herein.

The invention provides a means whereby vendors of existing hardware and soft ware can integrate the hardware or software into the environment of a centrally managed network computing system, without having to retrofit the hardware with new firmware or without having to redesign the existing software. The system provides an export service that allows a system administrator to generate configuration files in the format that the existing hardware or software expects and to store the files at the server in a way that the existing hardware or software can access the files in the manner for which it is designed. To take advantage of the export service, a hardware vendor, for example a vendor of an existing terminal, creates a special configuration application and an export agent module. The special configuration application is executed at a system administrator station and allows the administrator to create configuration information for the hardware. The export agent module resides on the server. When the vendor supplied configuration application is executed by an administrator and a request is made to save the configuration information generated by the configuration application on the server, the save call to the server includes an export tag parameter that tells the server to invoke the specified export agent. The export agent takes the configuration information from the configuration application and modifies its format to that required by the hardware. In addition, the context being configured is passed to the export agent. The context includes information unique to the particular instance of hardware that is being configured, typically but not necessarily the media access control address of the hardware, that provides information to the export agent indicating where to store a file or files that contain the modified configuration so that it does not collide with similar information for other instances of the hardware and can be accessed directly by the piece of hardware from the server in the way that it is designed to do. Existing software applications can also be retrofitted into the system without redesign, if desired, in the same way.

In the preferred embodiment, the system comprising a network which interconnects interconnecting a server and a plurality of user stations. The server stores a plurality of end user applications for downloading to user stations and further stores configuration preferences for the end user applications in the context of different groups and subgroups of users. A profile manager is provided at an administrators station. The profile manager is arranged to execute a configuration application for the non-native stations or applications, whereby the administrator can specify configuration preferences for non-native stations or applications in the context of different groups and subgroups of system users. An export agent corresponding to the configuration application is also provided at the server. The export agent is invoked when a request is made by the profile manager to store preference information on the server for the non-native terminal or application. The export agent reformats the preference information into a format compatible with the non-native terminal or application, and it stores the reformatted information in a location on the server which is known to the non-native terminal or application for direct access by the non-native terminal or application.

BRIEF DESCRIPTION OF THE DRAWING

In the Drawing,

FIG. 3 shows one illustrative hierarchical organization of user groups and users of a system. The illustrative hierarchical organization might also contain individual terminals and terminal groups; however, these are omitted for simplicity;

FIG. 4 shows one illustrative listing of individual users and the group priority order that is used to determine a set of preferences from the hierarchical organization of FIG. 3 that apply to a user and a specific application executed by the user;.

FIGS. 12 through 24 show a variety of actual administrator screen snapshots in various phases of application administration, including building of a hierarchy of which FIG. 3 is a representation of an example of, the creation and deletion of users, etc. the establishment of application preferences for applications, and context changes during preference establishment.

DETAILED DESCRIPTION

Figure 1:
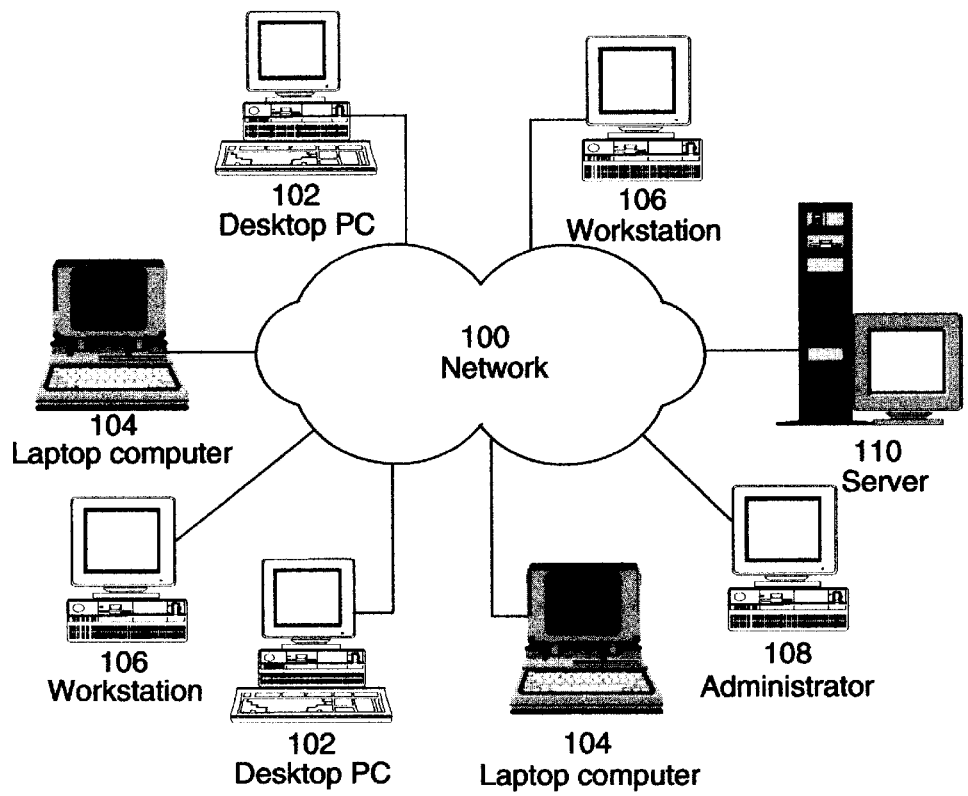
FIG. 1 shows an illustrative network and user stations, including an administrator's station, in which the invention might be practiced.

The system described herein provides a common repository for configuration information for all users and applets in a client-server environment. This is referred to as client profile management. The system allows users to roam, that is, to log-in from any computer in the system at any time and have it configured automatically at run time according to the preferences stored at the server. The preferred embodiment is a Java (Java is a Trademark of Sun, Inc.) based system and the client computers use a web browser interface arranged to execute Java programs.

The terms "applet" and "servlet" are established terms in the Java programming language art and will be used herein, since the terms have meaning to those skilled in this art "Applet" refers to an independent software module that runs within a Java enabled web browser. Servlet refers to a software module that resides on a Java enabled web server. It is to be understood that the use of the terms "applet" and "servlet" herein is not intended to limit the invention in any way. For clarification, the phrase "configuration applet" is used herein to refer to a software module used to configure preferences for an end user software application such as a word processor, a database manager, etc. Since software applications are also "applets" in the Java environment, the phrase "user applet" or just "applet" is used herein to refer to an end user application.

In the preferred embodiment, user applets and the desktop applet are assumed to be Java applets. However, it is understood that the invention is not limited to a Java environment. The invention can be used in any client-server system. For example, if desired, the system could be designed to use proprietary communication protocols and applications written and compiled in any desired programming language. Further, even in the preferred Java based environment, disk-based computers might access some applications locally, and other applets from the server. Preferences for the locally stored applications might be stored locally in the traditional manner, while preferences for the server-based applets might be handled in the way described herein. Preferably, however, preferences for locally stored applications are stored on the server using the Profile Management Properties API in addition to the preferences for server based applets described herein.

A simple Application Program Interface (API) allows applets written to the API to easily store and retrieve preference data when the applet is executed by a user or administrator. Applet permissions and user preferences can be defined based on group memberships and individual identity.

Client profile management includes the following services:

Log-on support—mapping to a user profile;

User support—the administrative ability to create user identifications and provide services and preferences directly to users;

User groups support—the administrative ability to create hierarchical groups of users and to provide services and preferences based on group memberships;

User applet context transparency—automatic determination of the context of user applet execution. That is, the determination of the user and/or group profiles that apply to a user applet execution and the automatic establishment of the profile environment;

User applet preferences repository—context-sensitive server storage for user applet configuration data;

Dynamic user applet preferences inheritance—hierarchical load-time coalescence of user applet preferences via the object-oriented principal of inheritance; and User applet access control—control of user applet execution based on group default membership privileges. The administrator can override default group privileges and permit or deny additional access privileges for individual users.

Profile management provides a framework through which these tasks are performed. Some tasks are supported by profile management directly, e.g. user/group management, applet lists, context switching, preference inheritance, etc., while configuration services specific to user applets are usually supported by separate configuration applets invoked by a system administrator within the client profile management environment. Some end user applets might provide the configuration capability as part of the end user applet. If this is the case, the administrator can run the end user applet (as opposed to a separate configuration applet) in the context of individual users and groups to set the configuration preferences for those users and groups.

FIG. 1 shows one high level view of an intended environment for practicing the invention. A network 100 is provided for interconnecting a plurality of user stations, such as desktop personal computers 102, mobile laptop computers 104, workstations 106 (e.g., RISC computers), an administrator's station 108 and a server 110. In one embodiment, network 100 might be a local area network. In another embodiment, network 100 might include wide area networking for entities such as corporations that have geographically displaced sites that are still included within the system. There is no intent to limit the environment in which the invention might be practiced; indeed, a network of any type that interconnects many types of stations is envisioned.

Figure 2:
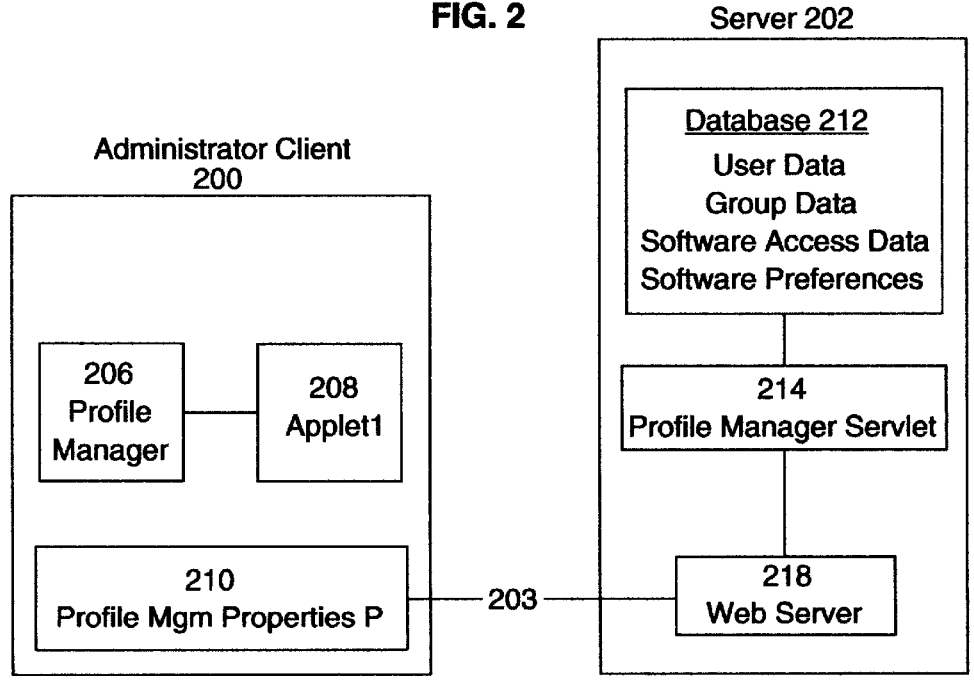
FIG. 2 shows an illustrative block diagram form of the administrator's station in communication with a server, and components of the administrator's station and the server for providing the central profile management and preference administration.

A high-level diagram of the profile management administrative operating environment is shown in FIG. 2. An administrator client network computer 200 is represented on the left of the Fig. and a server 202 for the system is on the right. The client and server communicate via a network represented as 203. The particular example of FIG. 2 assumes that the client computer is a system administrator's computer.

Profile manager 206 on the client side allows the administrator to configure user applet preferences at both user and group levels. The administrator can create new users and group hierarchies, add users to different groups, specify applet permissions for each group and for individual users. And the administrator can configure applets in the context of an individual user or a group. The administrator can add, delete and reset passwords for users. Profile management support is transparent to the general user. The administrator can invoke the profile manager 206 in the context of any user or group. Only the administrator can change from his/her context to administer clients (users) and groups. The server will not allow a user without administrative authority to switch context. When a request comes into the server, it will query the authenticated ID of the user trying to access this function. If the user does not possess administrative authority, (i.e., is not a member of the AllUsers.Administrator group), the Profile Manager Servlet 214 will reject the request.

Profile manager 206 invokes other applets, such as applet1 (208), as shown in FIG. 2. In this example, applet1 might be the administrative applet for configuring preferences related to user desktops. Or applet1 could be a configuration utility related to an end user applet, such as editors, word processors, databases, etc. It is preferred, but not required, that configuration applets such as 208 exist as modules separate from their corresponding user applets. In the context of FIG. 2, Applet1 is typically a configuration applet for a user applet; the administrator runs the configuration applet applet1 under a group context to set group preference and permission defaults, or in a user context to customize user applet configurations for an individual. By implementing applet1 as a module separate from its user applet, performance is enhanced, since the configuration applet1 will likely be small compared to the user applet. Also, separate configuration applets allow the administrator to control the end users ability to configure the user applet.

Traditional stand-alone computers store user applet configuration information locally in association with its the user applet. Traditional stand-alone Java based computers store user applet configuration information using the format provided by the java.util.Properties class. Both arrangements require that the user applet specify the name of a local file in which to store configuration information related to the user applet. In other words, a relationship is required between the computer and the user applet loaded on it. Profile management as described herein provides the familiar capabilities of a real java.util.Properties object plus additional facilities supporting user-roaming capabilities and seamless pluggability into a powerful administrative framework (the Profile Manager).

ProfileManagementProperties P 210 is a properties object for applet1 and provides an API between Applet1 and the server that allows the server to determine where to store configuration information for applet1 in the context of users and groups. The ProfileManagementProperties object class provides all of the functionality of the java.util.properties class with the further ability to provide create, save, and retrieve the configuration information for software from permanent storage. Storing such information in a central location makes management of user and group configurations possible. When a user is in the role of administrator, ProfileManagementProperties 210 allows the administrator to configure the user applet corresponding to configuration applet1, or to configure applet1 if applet1 is an end user applet, and store the configuration information in the proper place on the server in the proper context. This allows the establishment of a relationship between the user applet and the user, rather than between user applet and computer as in traditional systems. ProfileManagementProperties 210 is an extension of the java.util.Properties class. The extension allows the key/value pairs of preference information of a Properties object to be associated with a key, as opposed to a stream, as with java.util.Properties. This, in turn, allows application developers to use the key to specify a unique location relative to a context for preference information, rather than a file name and path. ProfileManagementProperties 210 determines the key automatically. The generation of the key is discussed more in connection with FIGS. 8 and 9. By modeling ProfileManagementProperties 210 after the java.util.Properties class, the system can take advantage of preference inheritance through recursive class-default evaluation. Thus, this extended class provides a "group default" capability by accumulating preferences starting at a current context, as discussed with respect to FIG. 3, and traversing up the contextual hierarchy for defaults.

Server 202 includes a database 212 that stores user data and group data, such as user and group preferences and user applet access permissions. Webserver 218 represents a typical web server with support for Java applets. Profile Manager servlet 214 maps user and group identifications to preference data. It also maintains an access control list to manage user access to applications on the server.

User and group preferences are stored as a tree hierarchy, as shown in FIG. 3. All users of the system automatically belong to the top group AllUsers. All users belong to the AllUsers group; this group contains the default preferences for some or all user applets on the server. In FIG. 3, it is assumed that the server contains at least three user applets, identified as App3, App4 and App5. As indicated in the AllUsers group, the default background (BG) for App3 is BG=blue. Other illustrative preferences labeled as x, y and z are shown to have the default values of 1, 2 and 3 respectively. The terms x, y and z are intended to represent any desired preference and the values 1, 2 and 3 are arbitrary and used merely to illustrate the point. The x preference might for example be the screen font for the desktop; the value x=1 might call for a default font of Times-Roman. Similarly, the default preferences for App4 for all users are BG=gray, x=2, y=2 and z=2..

The default values in the AllUsers group can be modified in any desired way for other contexts, such as for other user groups and individual users. By way of example, in addition to the context of AllUsers in FIG. 3, four other groups (GroupX, GroupY, GroupY1 and GroupY2) are shown. Additionally, two individuals User1 and UserN are shown. Users can be members of more than one group. In FIG. 3, User1 is a member of AllUsers, GroupX and GroupY1; UsenN is a member of AllUsers and GroupY2. If a user is a member of more than one group (another group in addition to AllUsers), then the groups are prioritized for the purpose of selecting the preferences for a given applet for that user. The administrator configures the group priorities for a user. Group priority is illustrated in FIG. 4. In FIG. 4, User1 has GroupX (identified by the fully qualified name of AllUsers. GroupX for his or her highest priority group. User1's next highest priority group is GroupY1 (AllUsers.GroupY.GroupY1). User1's lowest priority group is the AllUsers group. When a user, say User1, requests to run an applet say App3, the preferences are coalesced from the tree of FIG. 3 according to the group or groups to which the user belongs and the user applet is configured on the user desktop accordingly.

The first step in coalescing preferences for any context is to get the defaults. The defaults for a user, if there are any, is the coalesced set of preferences for the applet from the highest priority group from which preference information for the applet can be obtained. The defaults for a group, if there are any, is the coalesced set of preferences for the applet from the groups parent (i.e., The AllUsers group is the parent of AllUsers.GroupX). If a group has no parent (i.e., the top level AllUsers group), there are no defaults for that group. To coalesce the preferences for an applet at a context, the preferences for the applet explicitly stored at the context, overwrite the default preferences for the applet for the context. Thus, to coalesce preferences into the default set for an applet in a group context, recursive calls are made from each group node up to the AllUsers group requesting each parents set of preferences for the applet. Please refer to FIG. 3 to Illustrate the following example. For example, if the context is Allusers.GroupY.GroupY1, a call is made to the parent of GroupY1, which is GroupY, requesting its default preferences for the applet. GroupY1 makes a recursive call to its parent, which is AllUsers. AllUsers has no parent, so AllUsers returns it set of preferences for the applet to the call from GroupY. This set of preferences is modified by the preferences stored in GroupY for the applet, if any. This is now the default set of preferences for the applet for the context of GroupY1. This set of default preferences is returned to GroupY1 as a result of the recursive call from GroupY1 to GroupY, and are modified by the preferences at GroupY1 for the applet, if any, to become the actual set of preferences to be used in this instance. The set of preferences for the context of a user is built in the same way, except that the highest priority group from which preference information can be obtained for the user is used to first establish the group context from which the defaults will be obtained. Then the recursive procedure described above is used to build the actual set of preferences for the user and the applet requested by the user.

The following examples illustrate the above preference coalescence and should be read in conjunction with FIG. 3.

Example 1: An administrator runs a configuration applet for App3 to set preferences for the group AllUsers.GroupX.

To set the preferences for App3 in the context of Allusers.GroupX, the present set of preferences must be determined. AllUsers.GroupX requests defaults for its parent AllUsers. Since AllUsers is the top level group, it returns its preferences for App3 to GroupX. These are the default preferences for App3 in the context of GroupX. Since GroupX has no preferences for App3, the default set from Allusers is the real set of preferences to be used. In this example, these preferences from the AllUsers group are : BG=Blue, x=1, y=2, z=3. The administrator can now modify use the configuration applet to modify the coalesced preferences in any desired manner.

Example 2: User1 requests execution of com.ibm.App3. Preferences must be coalesced for com.ibm.App3 in the context of User1.

FIG. 4 shows that the highest priority group for User1 is AllUsers.GroupX; this branch of the group hierarchy will be checked first for preference information pertaining to App3. From here on, the example is essentially the same as example 1 above, except that the coalesced set of preferences is used to configure App3 on the user's workstation. The preferences for App3 for User1 are : BG=Green, x=1, y=2, z=3 since the BG=Green preference stored in the User1's context for App3 over rides the default BG=Blue preference obtained from the AllUsers.GroupX branch of the preference tree.

Example 3: Coalescing preferences for com.ibm.App6 in the context of User1.

This example illustrates the situation of the highest priority group containing no coalesed preferences for the context of User1. Again, the highest priority group for User1 is GroupX. This group and its parent AllUsers contain no preferences for App6. Therefore, the next highest priority group is searched. The next highest priority group for User1 is GroupY1. A set of preferences can be obtained from this group for App6. The coalescence of preferences proceeds as described in example 1. Recursive calls are made from GroupY1 up the tree to the root AllUsers group and the preference sets are returned back down the recursive calls and modified along the way to form the default set. The default set is then modified with the preferences stored in GroupY1 to form the coalesced set of preferences that apply to this context. Stated briefly, Allusers returns a null set of preferences, since it has no preferences for App6. GroupY modifies this null set with the values a=1 and b=2 and returns this set to GroupY1 as the default set. GroupY1 modifies the default set with a =33. This set is returned to the User1 context for use as its default set. Since there are no preferences for App6 stored at the User1 context, the defaults obtained from the GroupY1 branch of the preference tree represent the fully coalesced set of preferences for App6. The real set of preferences thus becomes a=33, b=2 for this context.

The above 3 examples described the gathering of preferences in response to a load( ) for a particular piece of software. When preference information is saved for a piece of software, any preferences that have been explicitly written at the Context being saved to will be written to the data store (212) at the location specified by the combination of the Context the software is being run in and the key for the software whose preferences are being stored.

Permissions operate similarly: a new group has access to all the applet names permitted by the group itself as well as to all applets permitted by its supergroups. However, just as Java allows the programmer to override a superclass method, Profile Management allows the System Administrator the ability to override an inherited permission. This is called overriding a permission.

As with Java's form of inheritance, Profile Management's form of preferences and permissions inheritance is called single inheritance. Single inheritance means that each Profile Management group can have only one supergroup (although any given supergroup can have multiple subgroups).

Profile Management users (leaf nodes) may require membership in multiple groups, so a facility is required to limit preference inheritance to a single hierarchical group to minimize the chance of corrupt configurations due to the introduction of incompatible variable subsets introduced by cross group branch coalescing. By allowing a user's group memberships to be prioritized, profile management can follow a search order when looking for preferences related to a particular applet. In other words, starting with the group with the highest priority, the search will stop at the first group found to contain configuration data for the applet attempting to load its preferences.

A user inherits software permissions from group memberships. With careful enterprise modeling, the administrator can assign software access to many users without having to navigate through panels, one user at a time. Profile management controls access by programming the web server to permit/deny access to applets. The web server enforces the access control. The profile manager servlet is also protected by the WebServer requiring user ID's and passwords to be passed to the webserver for authentication purposes. It is standard browser functionality to prompt for user passwords as required.

Figure 5:
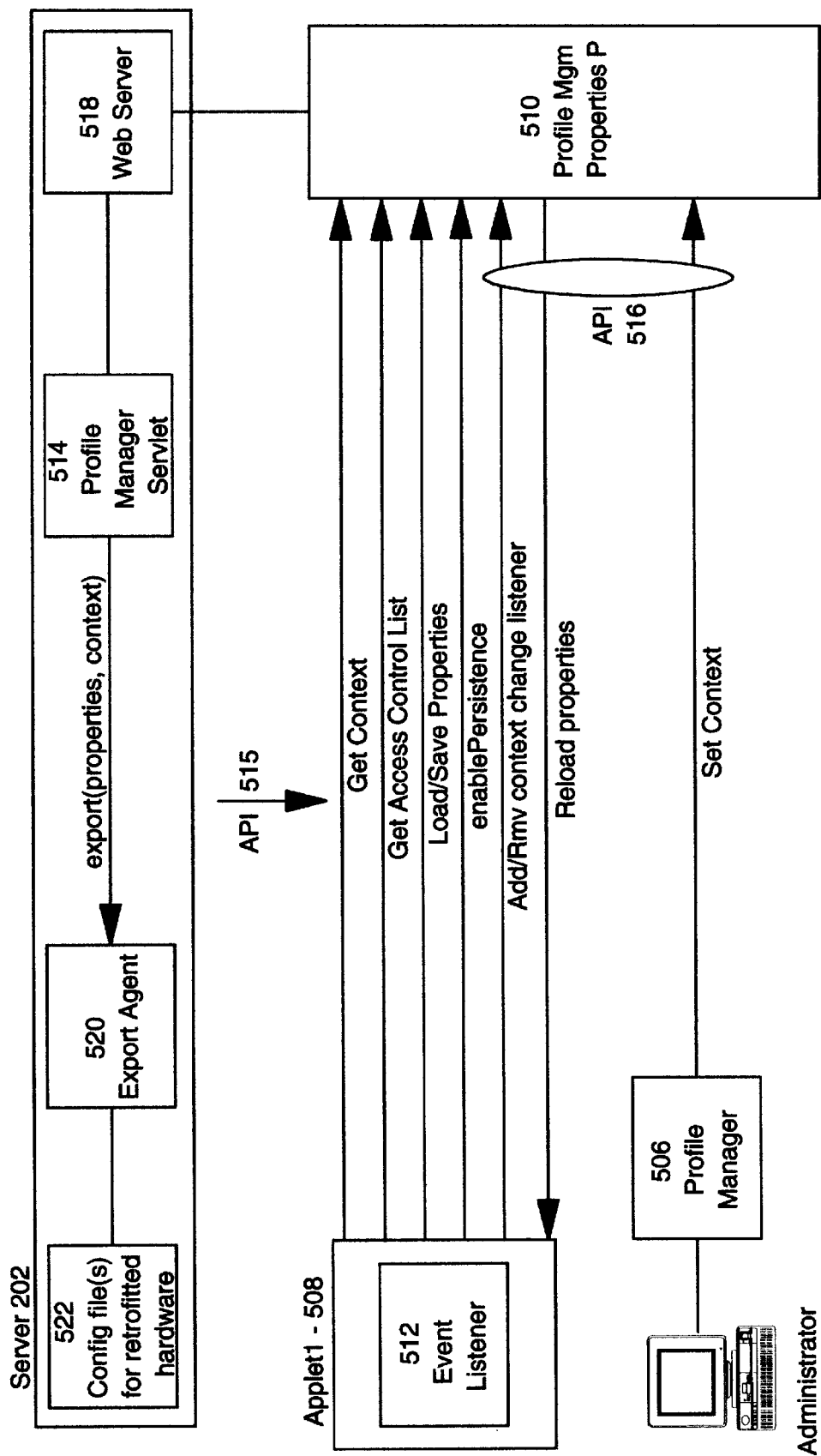
FIG. 5 shows a more detailed view of the administrator's station and server of FIG. 2.

FIG. 5 shows the system of FIG. 2 in more detail. Configuration applet Applet1 is invoked by the administrator within the profile management framework. Applet1 may implement the application program interface (API) 515 for querying information about its operational environment (e.g., query context, context changed events, query access control list for this context, etc.) to integrate tightly within the profile management framework, but this is not a requirement for a configuration applet. In any event, the designer of applet1 need only understand the basic API methods: enablePersistence( ), load( ), and save( ) in addition to the basic methods of a java.util.Properties object used to get preference information into and out of a java.util.Properties object. API 515 additionally provides list( ) and getContext( ) methods. Applet1 need only register with the ProfileManagementProperties class and call these methods as appropriate. The load( ) method can be called to retrieve the present state of preferences for the user applet being configured in the context of a user or group selected by the administrator The administrator can then modify the preferences as desired and store them using the configuration save functionality provided by the applet (which uses the save( ) method of its ProfileManagementProperties object. Similarly, if applet1 needs the list of user applets authorized for access by a user, it can use the list( ) method to obtain the list from the server. The getContext( ) method can be used by the applet to display the name of the context that it is running in or even to ensure that it only runs in a certain context (i.e., if an applet wanted to configure a service on the server using the export agent, it might only allow itself to be run at the AllUsers context since the configuration being exported is server specific as opposed to user specific. For applet1 to run in the profile management framework, all that is required is for the applet to register with ProfileManagementProperties 410 and implement the ProfileManagementProperties class, an extension of the java.util.Properties class.

The profile manager 506 also provides a context change API 516 for configuration applets. Applet1 may implement a context change event listener 512. The API 516 and the event listener 512 allows the administrator to change contexts (user or group) while running the configuration applet, without having to stop and restart it. For example, when configuring applet user preferences, the administrator will likely change contexts many times during the configuration. If the configuration applet is registered as a listener to such events, profile manager 506 will notify it of a context change via API 516. This allows applet1 to refresh its preferences from the server for each new context. Without the event listener API, applet1 would have to be terminated by the administrator and restarted after a new context has been selected to reference the existing preference information for the new context and avoid being stopped and restarted by the Profile Management applet. To register, applet1 calls a method on its properties object ProfileManagementProperties 510 i.e., addContextChangeListener (API 516) to register itself. When the administrator sets a new context, profile manager 506 performs a set context call (API 516) to object 510, which in response calls the reload method (API 516) on event listener 512. Event listener 512 now performs a load properties call to its properties object 510 to get the new preference data from the server for the new context, and causes applet1 to updates it GUI and internal variables to reflect the new preference information.

The above functionality avoids the possibility of a network administrator reading data from one context, changing context, and accidentally overwriting with a save( ) when intending to load( ) before making configuration changes in the new context.

Applets that do not register as listeners will be stopped, destroyed, reloaded, and restarted by the profile manager applet when the administrator forces a context change.

The profile management also provides a "properties export" service to allow the easy retrofitting of existing hardware and software into this profile management environment. The properties export service allows profile manager 514 to support user workstations (the physical hardware) as well as users, groups, and user applications. Since existing workstations do not know about ProfileManagementProperties 510, the export service allows workstation vendors to create workstation-configuration applets that specifies an export agent 520 to be invoked on the server when the vendor applet saves it preference information. The export tag causes an instance of a vendor-supplied class (the export agent 520 object) to be created and the export method to be invoked on the object to specify that workstation configuration information be saved in whatever proprietary file format and/file location(s) that are required by the workstation being configured.

Assume that applet1 is the configuration applet provided by a vendor for an existing terminal that is incompatible with the present profile management system. The vendor also supplies export agent 520. An administrator can configure the terminal for operation in this system by running profile manager 506, set the context to the terminal being configured, runs the vendor supplied configuration applet1 and configures the applet. When the administrator saves the configuration, part of the information that is transmitted to the server is a unique identifier that identifies the terminal being configured. Typically, this is the Media Access Control (MAC) address of the terminal. Profile manager servlet 514 detects that an export agent is specified on the save. Profile manager servlet 514 detects this from one of the preferences being saved that specifies need for the export agent. The preference specifies the export tag in the form of a key value pair of > XXXXEXPORT_AGENTXXXX={fully qualified class name of export agent}

The Export Agent's export(Context context, config properties) method is called by the profile manager servlet 514 to create one or more files 522 on the server from the save preferences information. The specific file or files are identified by the unique identifier of the terminal that came with the properties information from applet1. When the terminal later boots up, it uses its unique identifier to locate and retrieve its configuration information from files 522 on the server in the same manner that it always did, independent of the profile management system.

Figure 6:
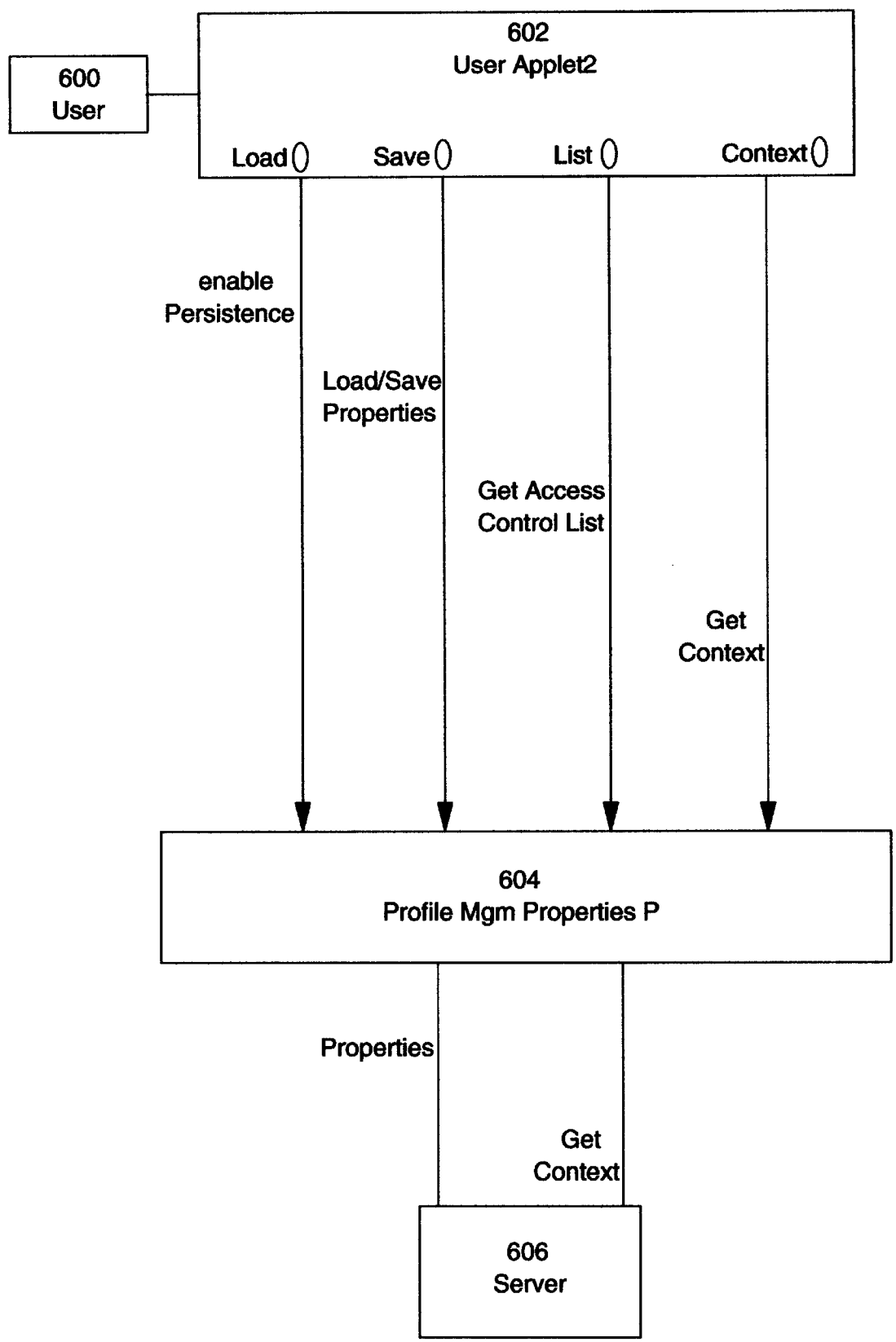
FIG. 6 shows an illustrative view of the software objects at a user's terminal, including a user application and the API between the application and other components, that cooperate to establish the user preferences during execution of the application as the user's terminal.

FIG. 6 illustrates an applet2 running on a client computer. Applet2 might be an end-user applet such as a word processor. In any event, applet2 has access to some of the the same API methods as shown at 515 of FIG. 5 if it desires. Applet2 uses the load method to retrieve preferences and the save method to save any preferences that might be changed by the end user. EnablePersistence initializes the Profile Management Properties object for applet2 with context equal to the user and generates the unique key for identifying the preference information storage location on the server, as described above relative to the administrator.

Figure 7:
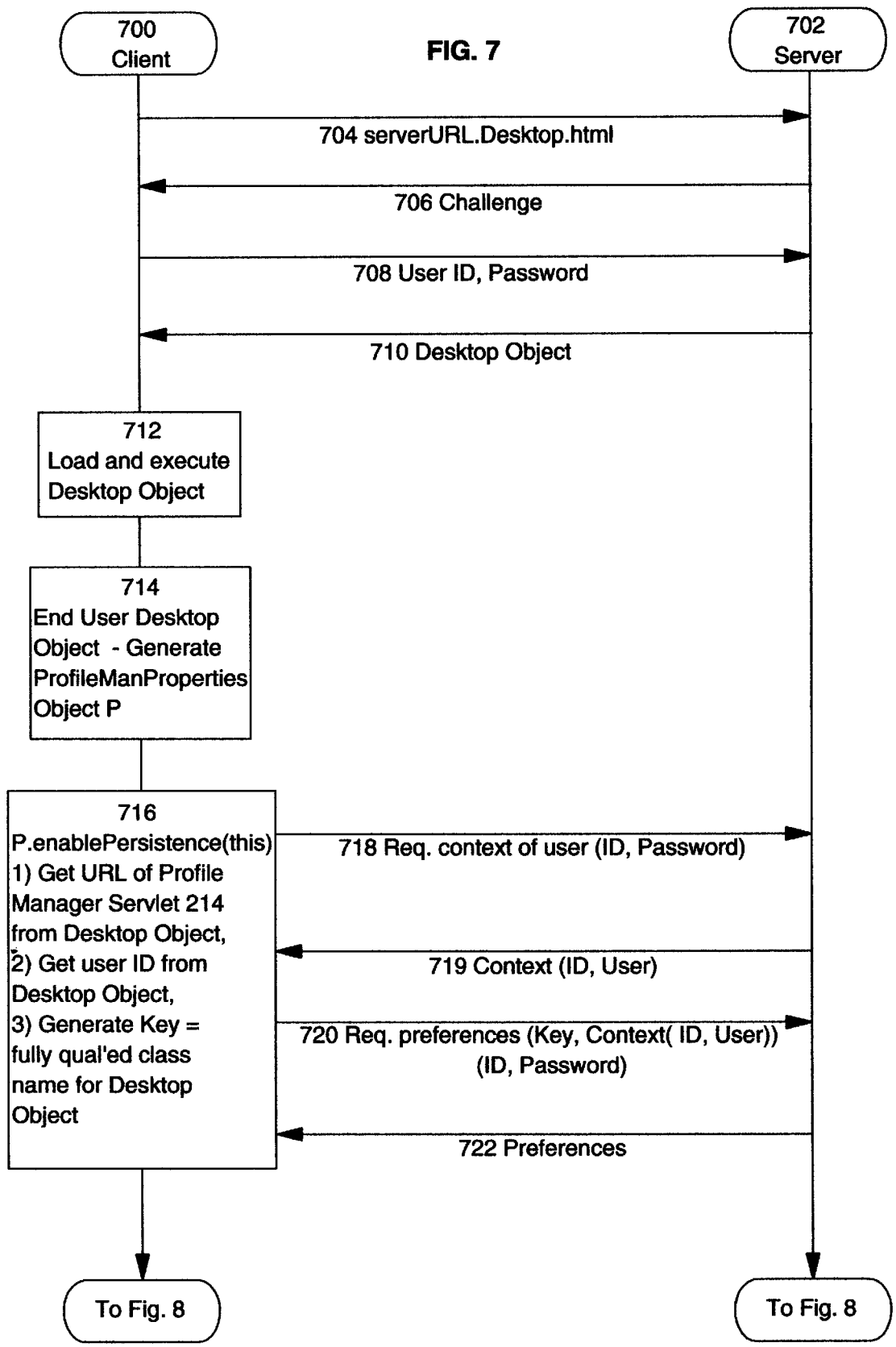
FIGS. 7 through 8 show illustrative operations at both a user's terminal and a server for user log-on and initially establishing the user's desktop, including desktop preferences, at the user terminal.

FIG. 7 shows the situation of a user bringing up his or her desktop. The user on the client (700) points his or her web browser at the URL of the desktop applet on the server and at step 704 sends a message http://server/Desktop.html). Since Desktop.html is a file that the server protects, a challenge is sent back to the web browser on the client at 706. The web browser on the client responds by prompting the user for a user ID and password. The client then sends the user ID and password information to the server at 708. The user ID and password are shown in bold at 708 of FIG. 3 to illustrate that this information is passed by the web browser itself. This type of nomenclature is used in other places to illustrate the same thing. Since, presumably, the user has permission to run the desktop applet, the request will be honored.

There are a series of interactions between the client and the server (not shown) where the code for the desktop applet is loaded to the client from the server. The desktop object is created and begins to execute at 712. The desktop object needs its preference information (i.e., configuration information) so it can tailor the desktop for the end user who is invoking it. To this end, as part of the desktop object's initialization process, the desktop creates a ProfileManagementProperties object P at 714, which is used to load,, get, cache, set, and save a copy of the user's preference information from the server for the desktop applet. The desktop object then performs an API call P.enablePersistence (desktopObject (applet)) at 716, which, at step 1) of 716, initializes the ProfileManagementProperties object P with the URL of the profile manager servlet 214. This URL is derived from the URL of the desktop applet that was loaded from the server previously. The ProfileManagementProperties object P sends a request 718 to the profile manager servlet 214 to get the context for the user running the desktop applet. In this case, the context consists of two components, a context name which is the ID of the user, and a context type which in this case is User. The profile manager servlet gets the ID of the user from the request 718 and returns the user context at 719. At step 2 of 716, the ProfileManagementProperties object P is initialized with the context of the user running the desktop. At step 3 of 716, the ProfileManagemenProperties object P generates a unique key for the desktop software by asking the Java desktop object P for its fully qualified class name. All Java objects know their class name. This unique key is combined with the user's context information to provide a parameter that specifies a unique location in the database 212 for storing the user specific preference information for the desktop applet. Any desired method can be used for mapping the string consisting of the fully qualified class name and the user context information into the data store location. Next, a request 720 is sent to the profile manager servlet 214 to get the preference information, tailored for the user, for the Desktop applet. The context and key are passed as part of the request 720 to identify the requested preference information. The profile manager servlet 214 responds with the requested preference information at 722, which is cached in the ProfileManagementProperties object P 604.

Figure 8:
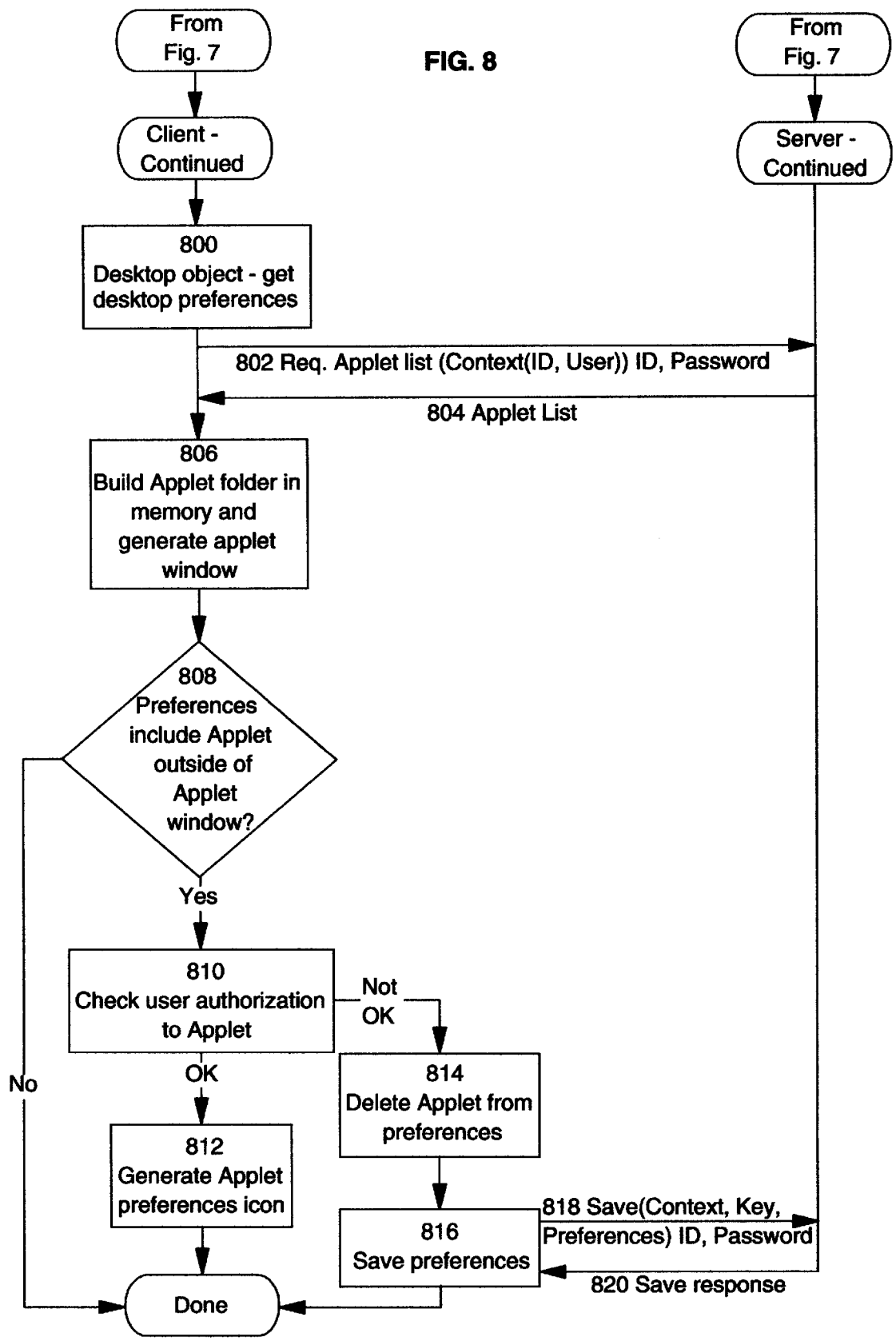

Continuing on at FIG. 8, at 800 the Desktop object reads it's preference information out of its ProfileManagementProperties object P, and begins to update the desktop accordingly (i.e., it might set the screen color to blue, get information about the position of icons, etc.). The desktop object calls a method on its ProfileManagementProperties object P to get a list of the software to which the user has access permission. The ProfileManagmentProperties object P requests the information at 802 from the profile manager servlet 214, which generates a response with the requested information at 804. For each such applet to which the user has access, the information includes a user friendly name, the applet's URL, the URL of an icon for the applet, etc. (information that is required for the desktop to represent the applet on the desktop and to load and launch it). and other optional material which is not relevant to the invention. This information is stored in the ProfileManagmentProperties object P, and returned to the desktop object. At 806, the desktop object uses the applet information to build a folder for the applets and to generate a window displaying the icons and the user friendly name for each applet to which the user has access.

Assume that in a previous run of the desktop by the user, the user dragged and dropped the icons for some of the software displayed in the folder that was just described. It is possible that at this time the user no longer has access to the applets that were dragged and dropped from the folder to the desktop. However, these desktop objects normally would be a part of the users preferences that were saved during the last run and would still be displayed on the desktop . To avoid this situation, the desktop examines its preferences from it's ProfileManagmentProperties object P to check for applets that are configured to appear outside of the window that is generated to display all applets to which the user has access. FIG. 8 assumes that there is only one applet outside of the applet window that is generated. If there were more than one such applet outside of the applet window, the following procedure would be looped for each such applet. At step 810 the desktop checks each of these applets appearing outside of the applet window against the list of applets from the server to which the user has access. If the applet appears in the list, the icon for the applet is placed on the desktop at 810 in the same position as before. If the user no longer has access to the applet, the applet is removed from the desktop's preferences at step 814 and removed from the ProfileManagmentProperties object P. If any applets are removed as part of this process, the desktop tells the ProfileManagmentProperties object P to save the preferences at step 816. The ProfileManagmentProperties object P sends a request 818 with the preference, key, and context information to the profile manager servlet 214 to save the new preferences information in the Database 212. The server sends a response 820 to the ProfileManagmentProperties object P informing the ProfileManagmentProperties object P that the request was successfully completed.

Figure 9:
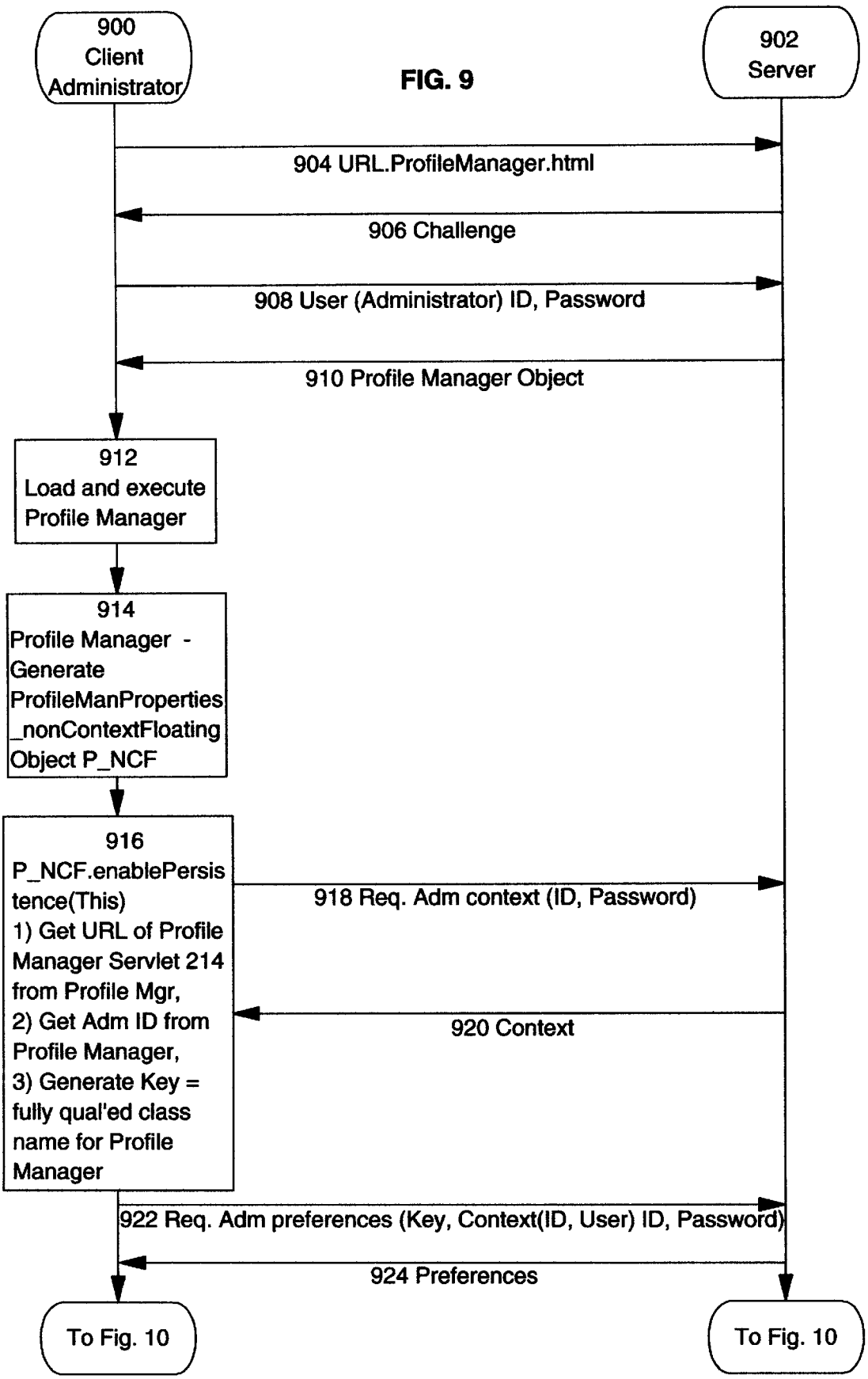
FIGS. 9 through 11 show illustrative operations at both an administrator's terminal and a server for administrator user log-on, establishment of the administrator's desktop, and, by way of example, the selection of an application and a context for configuration; the example also illustrates a context change during configuration the user's desktop and the resulting operations.

FIG. 9 illustrates the situation of an administrator running a configuration applet to configure preferences for an applet for other users or groups of users. It is understood that the principles discussed here also apply generally to the configuration of terminals or groups of terminals. The administrator on the client 900 points his or her web browser to the URL of the profile manager applet 214 on the server, which is to be run. The URL is sent to the server at 904. Since ProfileManager.html is a file that the server protects, a challenge 906 is sent back to the web browser on the client. The web browser responds by prompting the administrator for a user ID and password. The request to get ProfileManager.html is then repeated at 908 to the server with the user ID and password information included in the message. Since presumably the administrator has permission to run the profile manager, the request is honored and a profile manager applet is downloaded to the administrators terminal at 910. There are a series of interactions between the client and the server (not shown) where the code for the profile manager applet is loaded to the client from the server. The profile manager object is created and begins to execute at step 912.

A ProfileManagementProperties_nonContextFloating is used by the profile manager instead of a normal ProfileManagementProperties object.. It has the same behavior as a ProfileManagementProperties object with one exception: when preferences are loaded and saved, they are loaded and saved to and from the context of the administrator who is running the profile manager, as opposed to loading and saving to and from the context (i.e., user or user group) for which the administrator is configuring.

The profile manager object needs its preference information (i.e., configuration information) so it can tailor the profile manager for the administrator is invoking it. To this end, as part of the profile manager object's initialization process, the profile manager creates a ProfileManagementProperties_nonContextFloating object P_NCF at step 914, which is used to load, get, cache, set, and save a copy of the administrator's preference information from the server for the profile manager applet. The profile manager object then calls P_NCF.enablePersistence (profileManagerObject (applet)), which in step 1 of 916 initializes the ProfileManagementProperties_nonContextFloating object P_NCF with the URL of the profile manager servlet 214. This URL is derived from the URL of the profile manager applet. The ProfileManagementProperties_nonContextFloating object P_NCF sends a request 918 to the profile manager servlet 214 to get the context name (ID) of the administrator and the context type (USER). The profile manager servlet gets the ID of the administrator from the request (918). The web browser passes the administrator ID and password in the message along with the information sent by the ProfileManagementProperties_nonContextFloating object P_NCF. The ProfileManagementProperties_nonContextFloating object P_NCF is initialized with the context of the administrator running the applet at step 2 of 916. At step 3 of 916, the ProfileManagementProperties_nonContextFloating object P_NCF generates a unique key for the profile manager applet by asking the Java profileManagerObject object (passed as a parameter in the enablePersistence call) for its fully qualified class name (i.e., profileManagerObject.getClass( ).getName( ). This unique key, combined with the administrator's context information, is mapped to specify a unique location in the database 212 for the administrator's specific preference information for the profile manager applet.

A request (922) is sent to the profile manager servlet 214 to get the preference information tailored for the profile manager applet as configured for the administrator. The request (922) includes the appropriate context name and type and key information to identify the appropriate preference information. The profile manager servlet 214 responds with the requested preference information (924), which is cached in the ProfileManagementProperties_nonContextFloating object P_NCF. The profile manager reads its preference information out of the ProfileManagementProperties_nonContextFloating and updates itself accordingly (i.e., sets its background color to blue for example).

Figure 10:
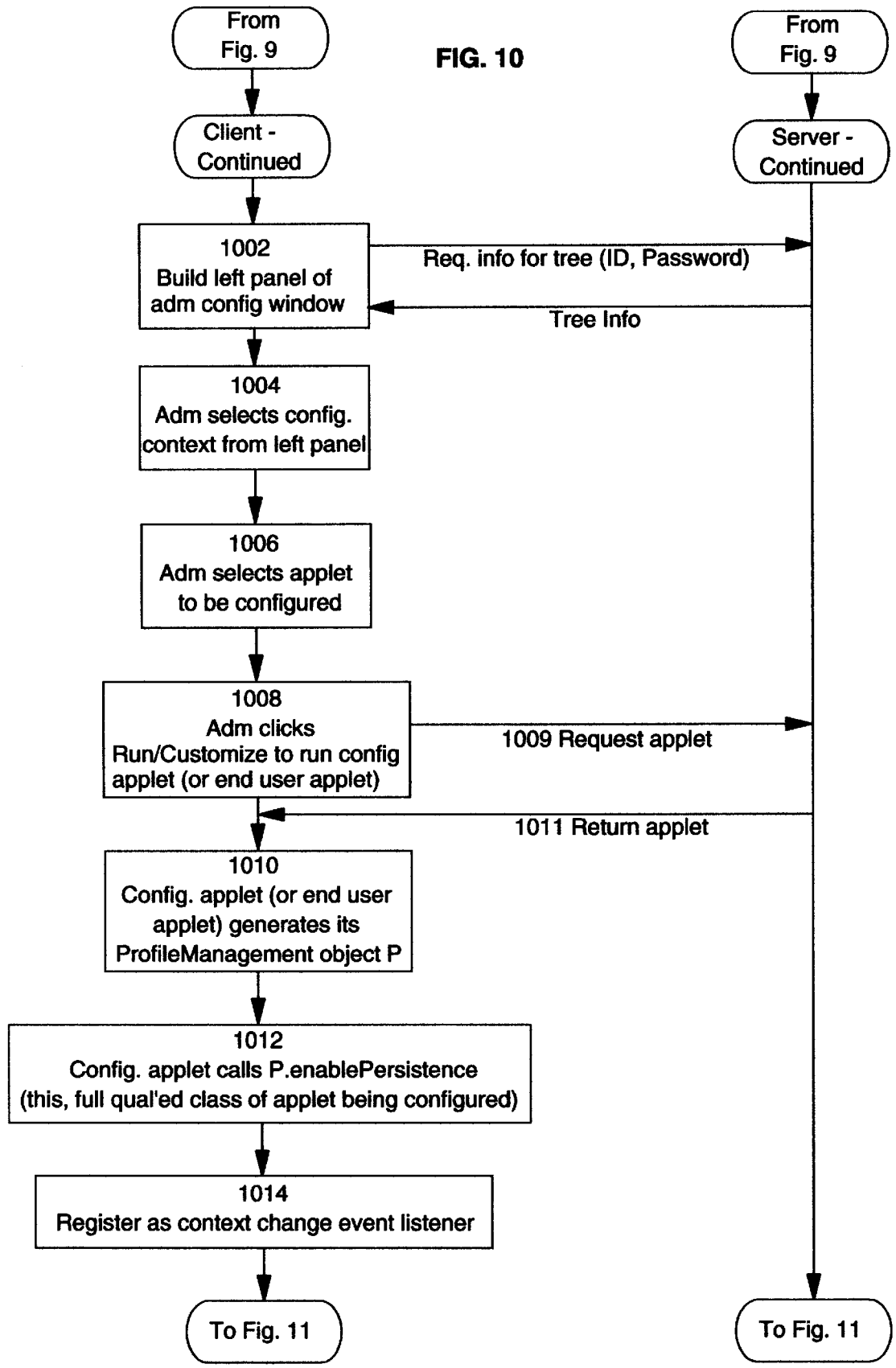

Operation continues at FIG. 10. The profile manager requests the information about existing users, user groups, and software from the profile manager servlet 214 and builds the tree in the left panel of the profile managers configuration window at 1002. See FIGS. 13 through 24 for examples of the administrator's left panel. At this point 1004, the administrator selects a desired context for configuring by clicking on a user or group from the left panel tree. The profile manager sets the context for ProfileManagementProperties objects by calling P_NCF.setContext(selected context). See FIG. 13 for a selected context of "User Groups", which refers to the group of all system users, or to FIG. 18, where a group context of "Development" is selected, or to FIG. 21 where a user context "colleend" is selected. Next, at step 1006, the administrator selects an applet to be configured from a list of all the applets on the server. See FIG. 17 for an example of selecting an applet. At step 1008, the administrator then clicks a Run/Customize button to run the applet selected for configuration. This applet might be a separate configuration applet for an end user applet, or it might be the end user applet itself. The selected applet is requested and loaded from the Server at 1009 and 1011. At step 1010, the configuration applet object is created and begins to execute and to generate its ProfileManagementProperties object P.

If it is assumed that the applet is a separate configuration applet for an end user applet, then at step 1012, the applet calls p.enablePersistence(configAppletObject, fullyQualifiedClassNameOfAppletBeingConfigured). On the other hand, if the applet is a user applet, rather than a separate configuration applet, the call would be p.enablePersistence(endUserAppletObject) since it wants to configure its own preference information as opposed to the preference information for another applet. The current Context is already known by the ProfileManagementProperties object P since it was previously set by the administrator via the administrator's ProfileManagementProperties_nonContextFloating object PM_NCF. The location of the profile manager servlet 214 was previously generated when enablePersistence was called on the Profile Managers ProfileManagementProperties_nonContextFloating object PM_NCF. In the case of a configuration applet, the unique key for the applet does not need to be generated because it is passed by the configuration applet to the ProfileManagementProperties object P in the enablepersistence call.

At step 1014, the configuration applet registers itself with its ProfileManagementProperties object P as a context change listener. As discussed earlier, this allows the applet's ProfileManagentProperties object P to notify the applet if the administrator makes a context change so that the applet can load the preference information for the new context and update its Graphical User Interface to reflect the new configuration information, without requiring that the applet be terminated and relaunched in the new context.

Figure 11:
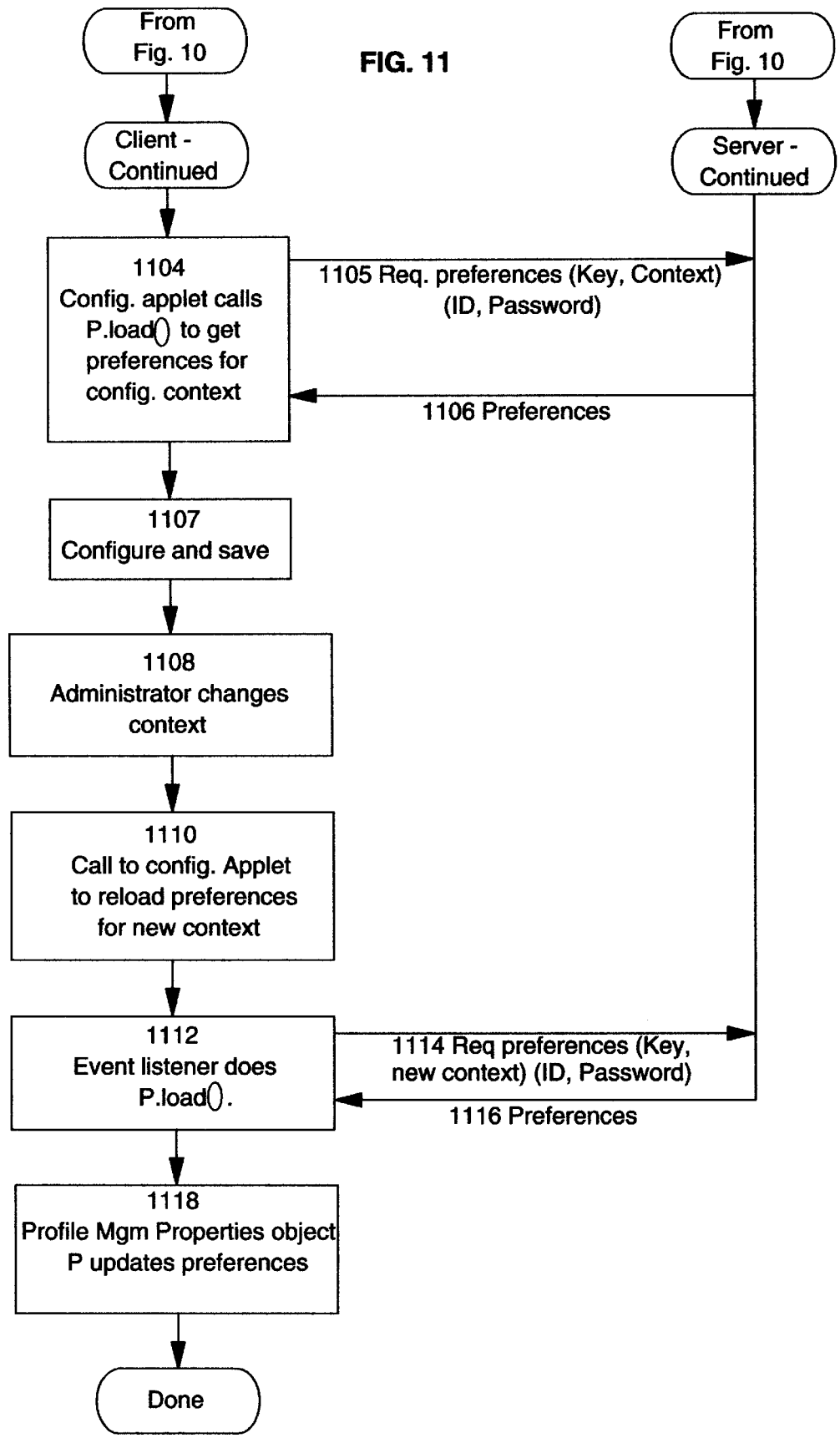

Operation continues at FIG. 11. At step 1104, the configuration applet tells the ProfileManagementProperties object P to load the preferences from the current context for the applet being configured. A request 1105 is sent to the profile manager servlet 214 to get the preference information, tailored for the context previously selected by the administrator, for the applet being configured. The request 1105 includes the appropriate context name (the context the administrator has selected) and the context type (USER, USER_GROUP, or ALL_USERS_GROUP as appropriate) and key information to specify the location of the appropriate preference information. The profile manager servlet 214 responds with the requested preference information at 1106, which is cached in the ProfileManagementProperties object P. The configuration applet gets preferences from the ProfileManagementProperties object P and updates its Graphical User Interface accordingly.

The administrator configures the applet at 1107 and saves the modified preferences, for example by clicking a SAVE button provided by the applet. As a result of this operation, the configuration applet calls the save( ) method on its ProfileManagementProperties object p. The ProfileManagementProperties object P sends the preferences and the unique key for the applet being configured and the information specifying the current context to the profile manager servlet 214. The profile manager servlet stores the preference information in the database 212 in the location specified by the Context and the key.

Step 1108 is an example of the administrator now changing context, while the configuration applet is still running. The administrator selects a new context by clicking on a user or user group (see FIG. 18 for examples of new contexts in the administrators left screen panel). As a result of the context change, profile manager 506 sends a set context message to ProfileMangementProperties object P (510) by calling P_NCF.setContext(selected NEW context), which in turn causes object P to notify event listener 512 of the context change via the reload properties API 515. This occurs at step 1110. At step 1112, the event listener 512 performs a load( ) call to retrieve the preferences for the new context and the object P is updated with the new preferences at step 1118. The administrator can now proceed to modify the new preferences for the new context, if desired, and to save them if required, and then to proceed on with a new context change if necessary as described above.

The remaining FIGS. 12 through 24 show actual screen snapshots of an administrator's workstation while running portions of the profile manager 206.

Figure 12:
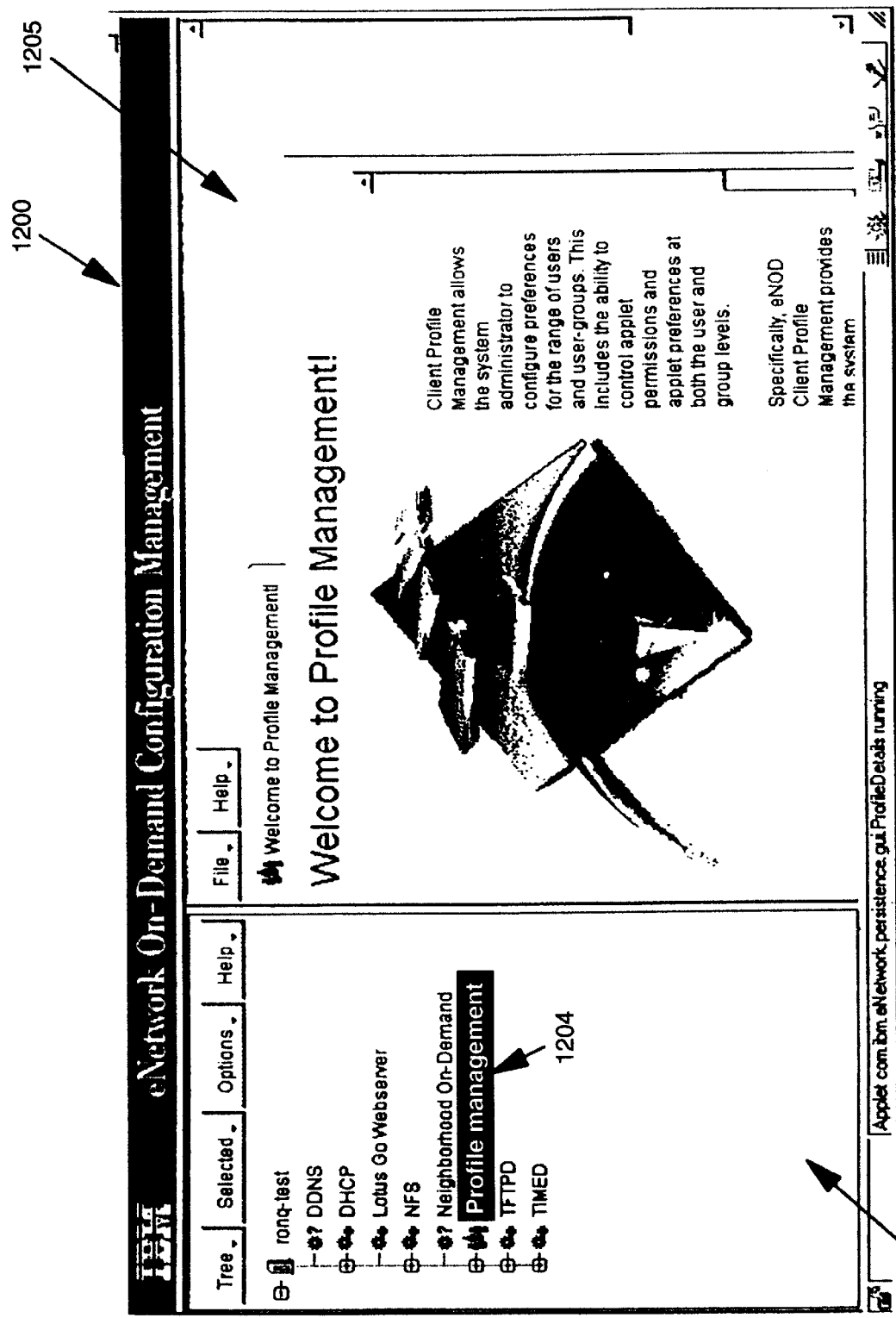

The main configuration window 1200 is shown in FIG. 12. The tree view panel 1202 on the left of the window depicts profile management 1204 as one of several services available on the server. When this item 1204 is selected as shown in FIG. 12, the right panel 1205 of the main window displays a welcome message for the profile management service. Expand and contract icons such as 1208 are used to control the appearance of sub-items under an item in the left panel, if any exist. The "+" in 1208 is called an "expand icon" and indicates that there are sub-items beneath "Profile management". The administrator can display these sub-items by clicking on the expand icon 1208, which will then become a "contract icon" ("–").

Figure 13:
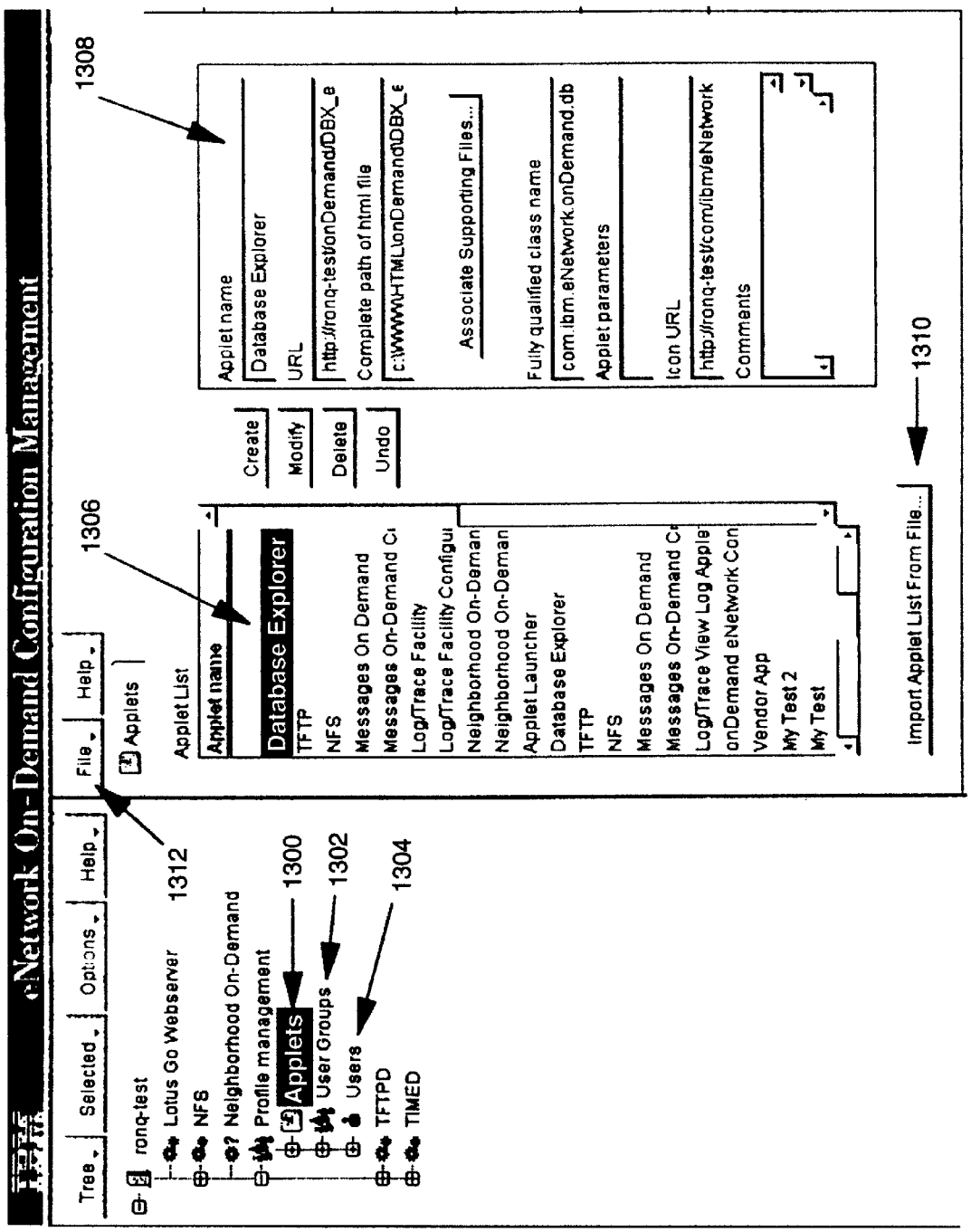

FIG. 13 illustrates an expansion of the Profile management item 1208 in FIG. 12, which results in the display of three default sub-items in FIG. 13—"Applets" 1300, "User Groups" 1302 and "Users" 1304. Expansion icons indicate that these items can also be expanded. "Applets" 1300 allows the administrator to define the user applets available on server 202, "User groups" 1302 allows the administrator to create and populate the user group tree of FIG. 3 and to set group preferences. "Users" 1304 allows the administrator to create new users and to set their preferences or to change preferences for existing users. In the example of FIG. 13 "Applets" 1300 is selected. When this item is selected, panel 1305 on the right of the window displays a list 1306 of user applets that have already been defined to the system. Attributes of the application that is selected in 1306 are shown at 1308. The administrator defines a new applet by selecting <NEW> in 1306 and entering the name and location information requested in 1308. An existing applet "Database Explorer" is shown selected in 1306. At 1308, the "Applet name" field displays this applet name. The "URL" (Universal Resource Locator) field displays the Intranet or Internet web address of this applet on server 202. The field "Complete path of html file" displays the directory path and file name of the applet in the disk directory structure of server 202. The field "Fully qualified class name" displays the fully qualified class name of the applet. The field "Icon URL" displays a web address of the image file used to generate an icon for the applet on a users desktop. The remaining fields are for optional information that may be required by the software upon invocation. A command button 1310, "Import Applet List from File", allows the administrator to append definitions of applets to the existing list 1306 from an existing text file. When button 1310 is clicked, the window shown in FIG. 14 pops-up and allows the administrator to enter the path and file name of the text file containing the applet definitions to be appended. To save all pending changes, the administrator clicks on File 1312 and then Save (not shown).

Figure 15:
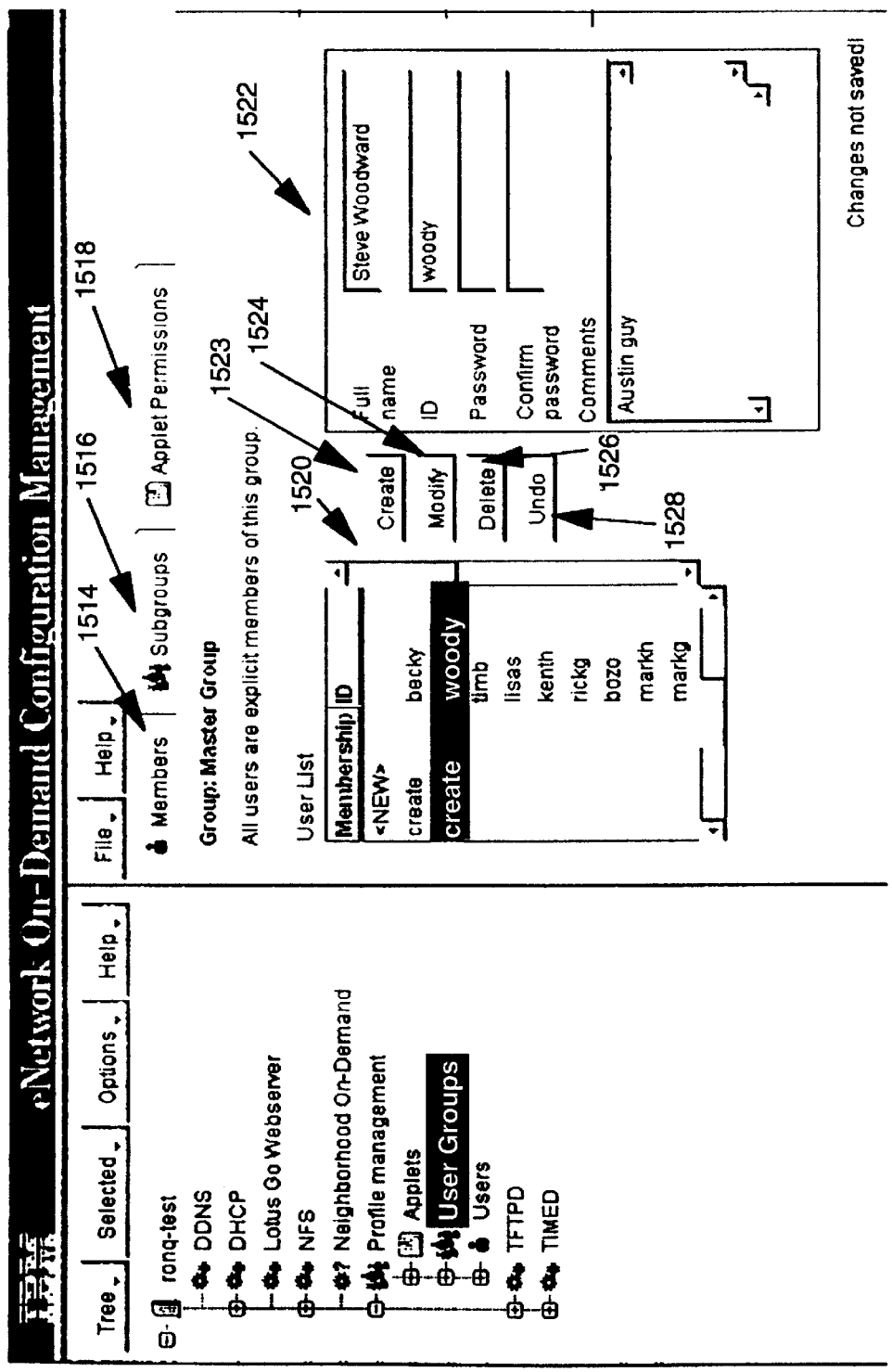

In the left panel, the User Groups item 1302 corresponds to the AllUsers group of FIG. 3 ("User Groups" and "AllUsers" are used interchangeably herein). FIG. 15 shows the right panel of the administrators station when the "User Groups" item 1302 is selected. In FIG. 15, a notebook panel is displayed on the right that contains three tabs—a Members tab 1514, a Subgroups tab 1516 and an Applet Permissions tab 1518. The Members tab is selected in FIG. 15. The Members panel contains a list 1520 of the log-on identifications of all members that have been defined to the system. To create a new user (who will automatically gain membership into the presently selected group context—"User Group"), the administrator selects <NEW> from the list 1520, enters the appropriate information in the entry fields 1522 to the right of the list, and then clicks on the Create button 1522. When an existing member is selected from the list 1520, the attributes previously saved for that user are displayed at 1522. These attributes include the full name of the selected member, the member's system ID, password and any desired comments. The attributes, except ID, may be edited and the changes committed (but not Saved) by clicking the Modify button 1524, or the user may be removed from the system entirely by clicking the Delete button 1526. Any pending change may be removed by selecting the entry in the list 1520 and clicking the Undo button 1528.

Figure 16:
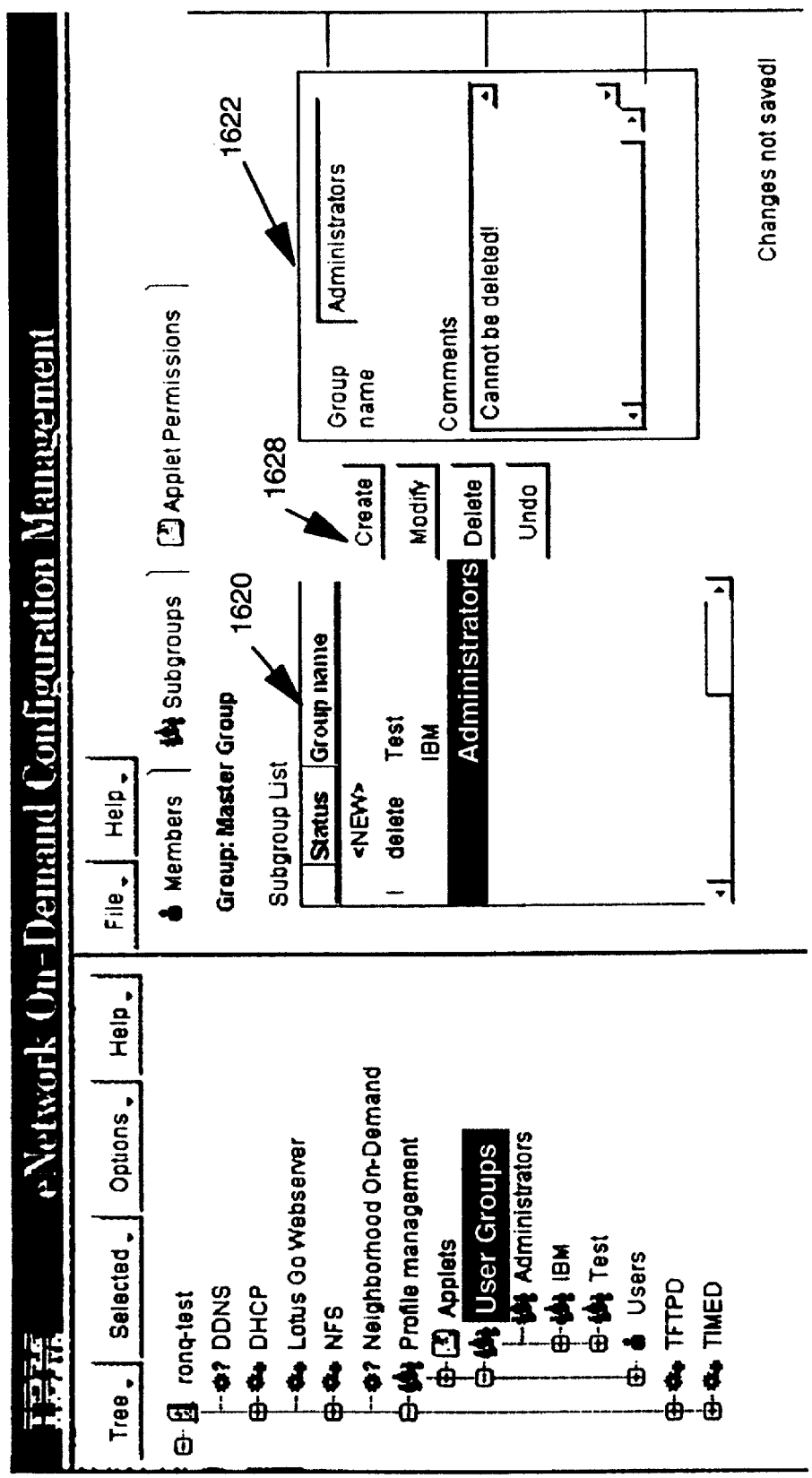

FIG. 16 shows the administrator's right panel that is displayed when the Subgroups tab 1516 is selected. Subgroup list 1620 shows existing groups that are subgroups of the item selected in the left panel, which is "User Group" in this example. Therefore, list 1620 displays all immediate subgroups of the "AllUsers" group. In the left panel, "User Groups" is expanded. The subgroups shown in list 1620 are also the expanded items under "User Groups" in left panel. In list 1620, a status field shows the present status of each subgroup, such as "! delete", "! Modify", and "! Create". An empty Status field in list 1620 indicates that the subgroup exists and no actions are pending to be saved. The "!" symbol indicates that the status is pending (not yet saved). Attributes for the subgroup selected in list 1620 appear in 1622. These attributes include the subgroup name and desired comments about the subgroup. To create a new subgroup, the administrator selects <NEW> from list 1620, enters the subgroup name and desired comments in 1622, and clicks the Create button 1628. An entry of "! create <subgroup name>" then appears in list 1620 as a pending action. To save all pending changes, the administrator clicks the File button in the top menu bar and then Save (not shown).

Figure 17:
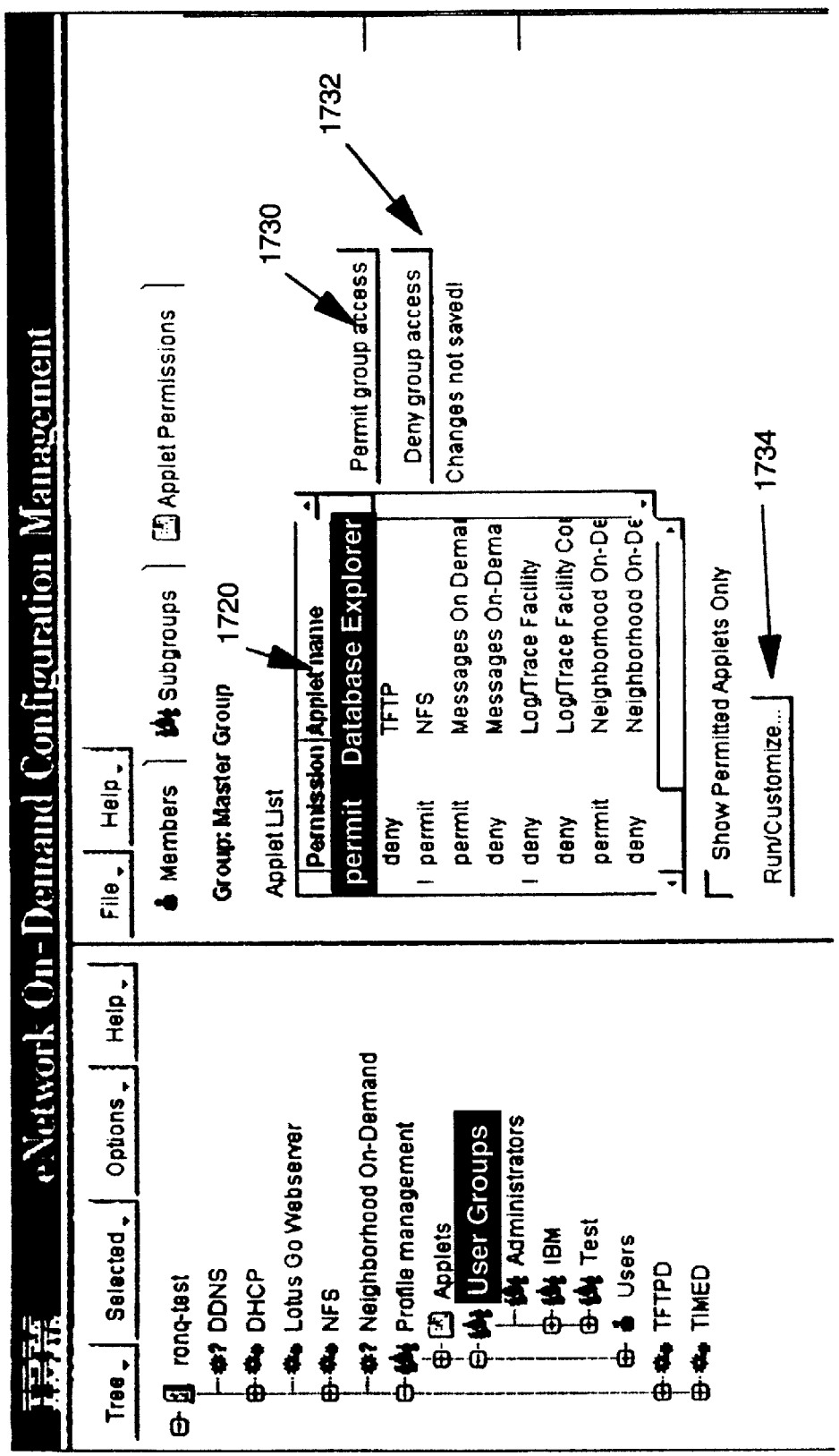

FIG. 17 shows the right panel that is displayed when the Applet Permissions tab 1518 is selected. List 1720 shows all names of all applets that have been defined to the system and the permission status (permit or deny access) that is assigned to each applet for the group or subgroup (the current "context") that is selected in the left panel. As with other notebook pages described, an exclamation point indicates that the status depicted is a change that is pending a Save. In FIG. 17, the group "User Groups" is selected in the tree shown in the left panel, which corresponds to the "AllUsers" group shown in FIG. 3. Since all users of the system have membership in the "User Groups" group, list 1720 shows the global default permissions for all system users for each applet defined to the system. For example, the default permission status for applet "Database Explorer" is "permit" (meaning access is permitted) for the "AllUsers" group; similarly, the default permission status for all users to applet TFTP is "deny" (access is denied). The administrator can change the permission status of an applet by selecting it in list 1720 and clicking the "Permit group access" button 1730 or the "Deny group access" button 1732. Furthermore, regardless of an applet's permission status for the selected context, an administrator can select an applet from 1720 and click the "Run/Customize" button 1734 to execute the user applet under the selected context. The panel region previously showing the notebook for the current context then becomes occupied by the executing user applet. If the user applet happens to be a configuration applet for other software, the administrator can then save software preferences (through the configuration applets unique facilities provided for this function) which will then be saved as the software's default preferences for the selected context. If the applet is an end user applet, the functions are the same, except the end user applet loads and saves it own preferences rather than preferences for a separate piece of software.

Figure 18:
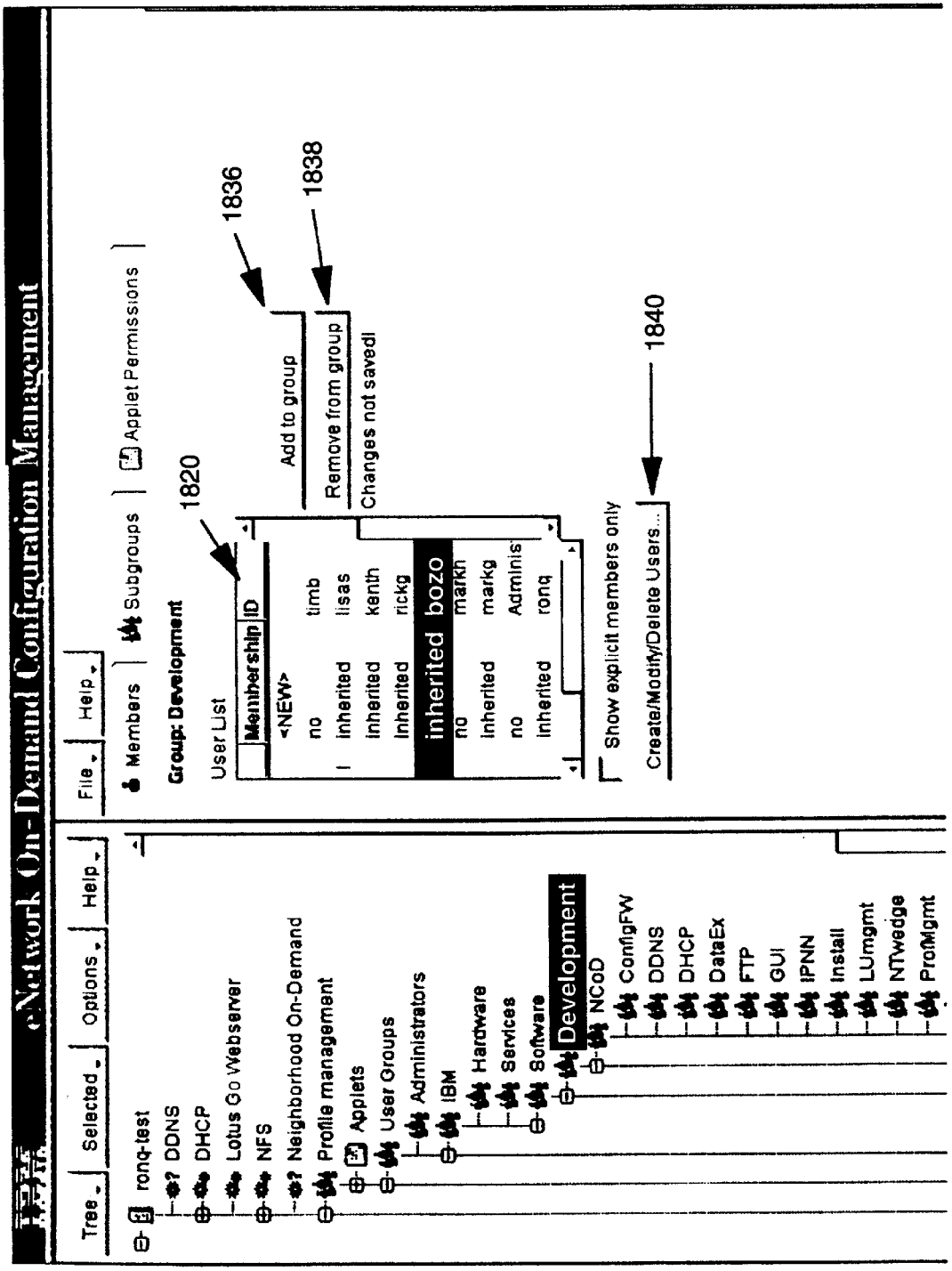

FIG. 18 shows the complete expansion of the administrators left panel subgroup tree beneath "User Groups".

Figure 19:
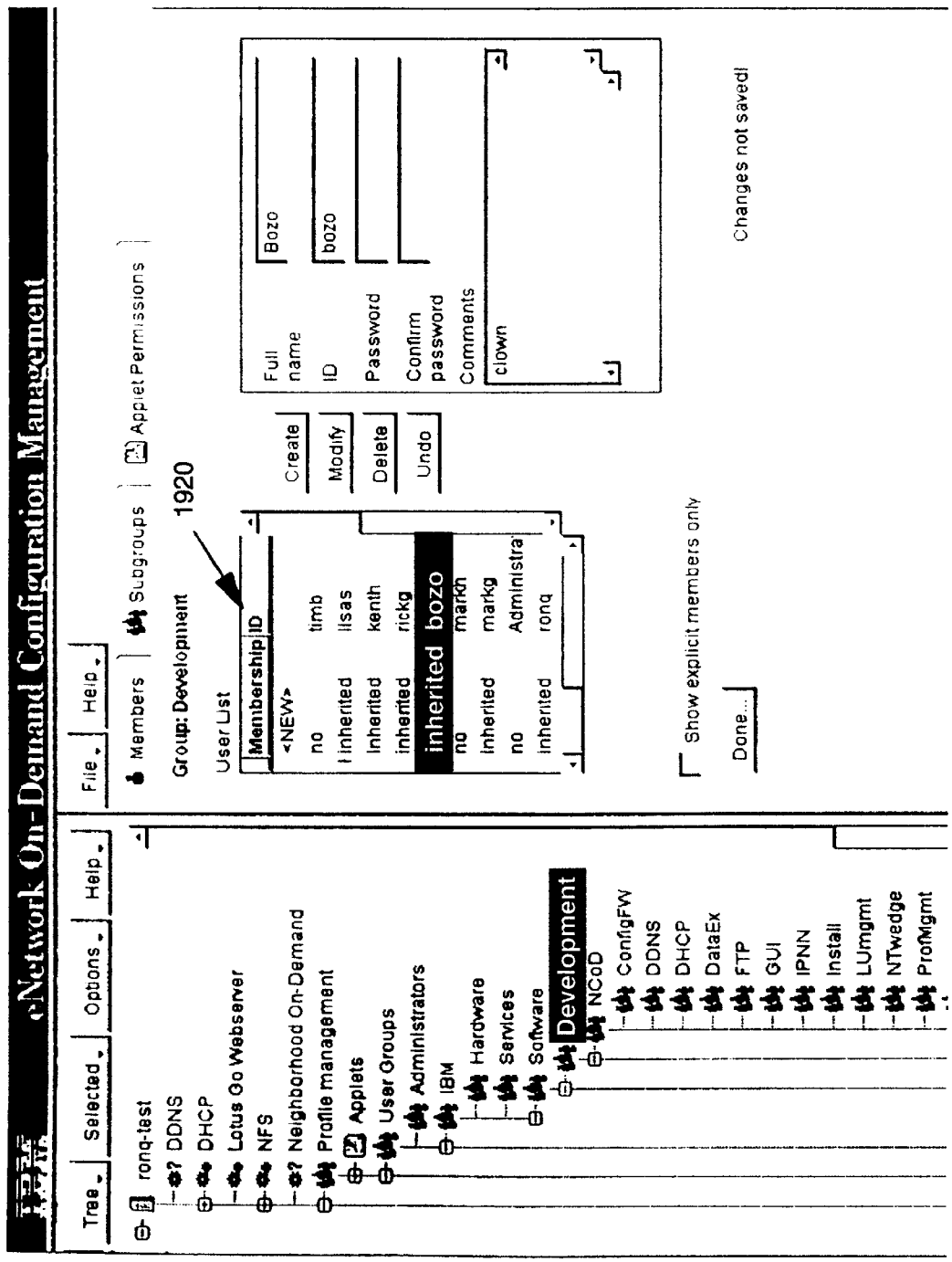

Immediately beneath "User Groups", there are two subgroups "Administrators", a default subgroup that cannot be removed, and "IBM", a subgroup defined by the administrator. The "IBM" subgroup has also been expanded and contains three subgroups "Hardware", "Services" and "Software". The "Software" subgroup has been expanded and contains at least one subgroup called "Development". The "Development" subgroup contains at least one subgroup called NCoD. Subgroup "NCoD" contains a number of subgroups, such as ConfigFW 58, which have no children. Also in this example, subgroup "Development" is selected in the expansion tree. Since "Development" is not at the top of the tree hierarchy (the "All Users" group), the notebook shown in the right panel is somewhat different from that of FIG. 15 when "User Groups" was selected, because all users are not automatically a member of "Development", as they are of "User Groups". The list 1820 displays the log-on system IDs of all system members. The status beside each user ID in list 1820 shows whether the user owns a membership in the "Development" subgroup. A status of "yes" indicates that the user is a member of the "Development" subgroup, "no" indicates that the user is not a member of the "Development" subgroup, and "inherited" indicates that the user inherits membership within the "Development" group by belonging to at least one of Development's subgroups further down the tree. A user's membership status for a subgroup is modified by the administrator by selecting the user in list 1820 and then clicking on the "Add to Group" button 1836 or "Remove from group" button 1838. If the administrator wishes to create a new system user, or modify or delete an existing member, the administrator clicks on the "Create/Modify/Delete Users" button button 1840. This action brings up the notebook page shown in FIG. 19. The right panel of FIG. 19 is similar to that of FIG. 15 and allows the administrator to create a new system user by selecting NEW in list 1920 and then clicking the "Create" button. Similarly, the administrator can modify or delete an existing system user by selecting the appropriate user in list 1920 and clicking the appropriate button "Modify" or "Delete". Users created at any subgroup context (e.g., "Development") not only gain the required membership in "User Groups", but are automatically made members of the selected subgroup. Changes to the system user list are saved by clicking on "File" in the top menu bar of the right panel and then clicking "Save" (not shown).

Figure 20:
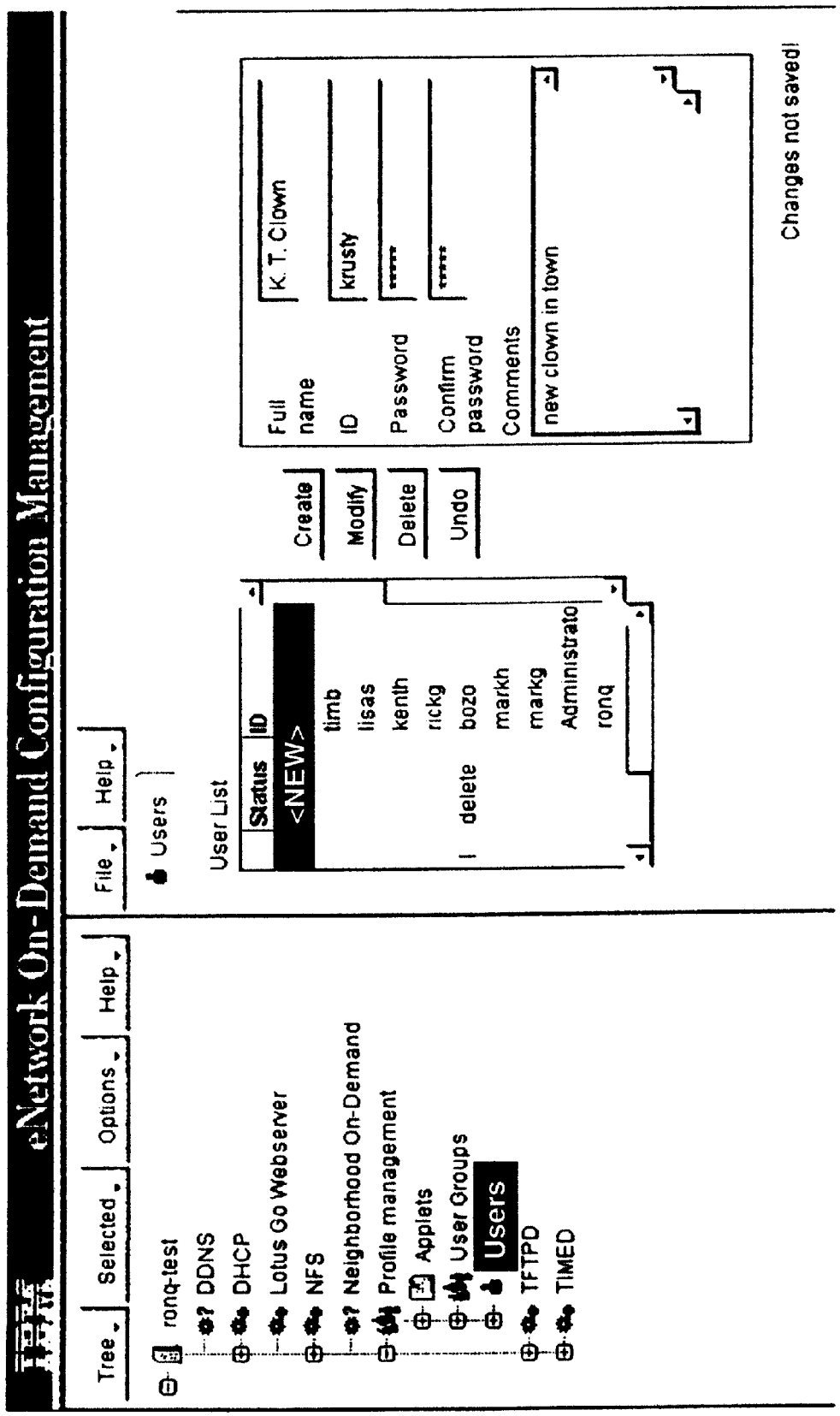

FIG. 20 shows a direct way to get to the system user list for editing, rather than through the group and subgroup route shown in FIG. 19. To get to FIG. 20, the administrator selects "Users" 1304 in the left panel of FIG. 13, for example. Then in the right panel shown in FIG. 20, the administrator can create new users and modify and delete existing users, as already discussed., without being in the context of a group or subgroup.

Figure 21:
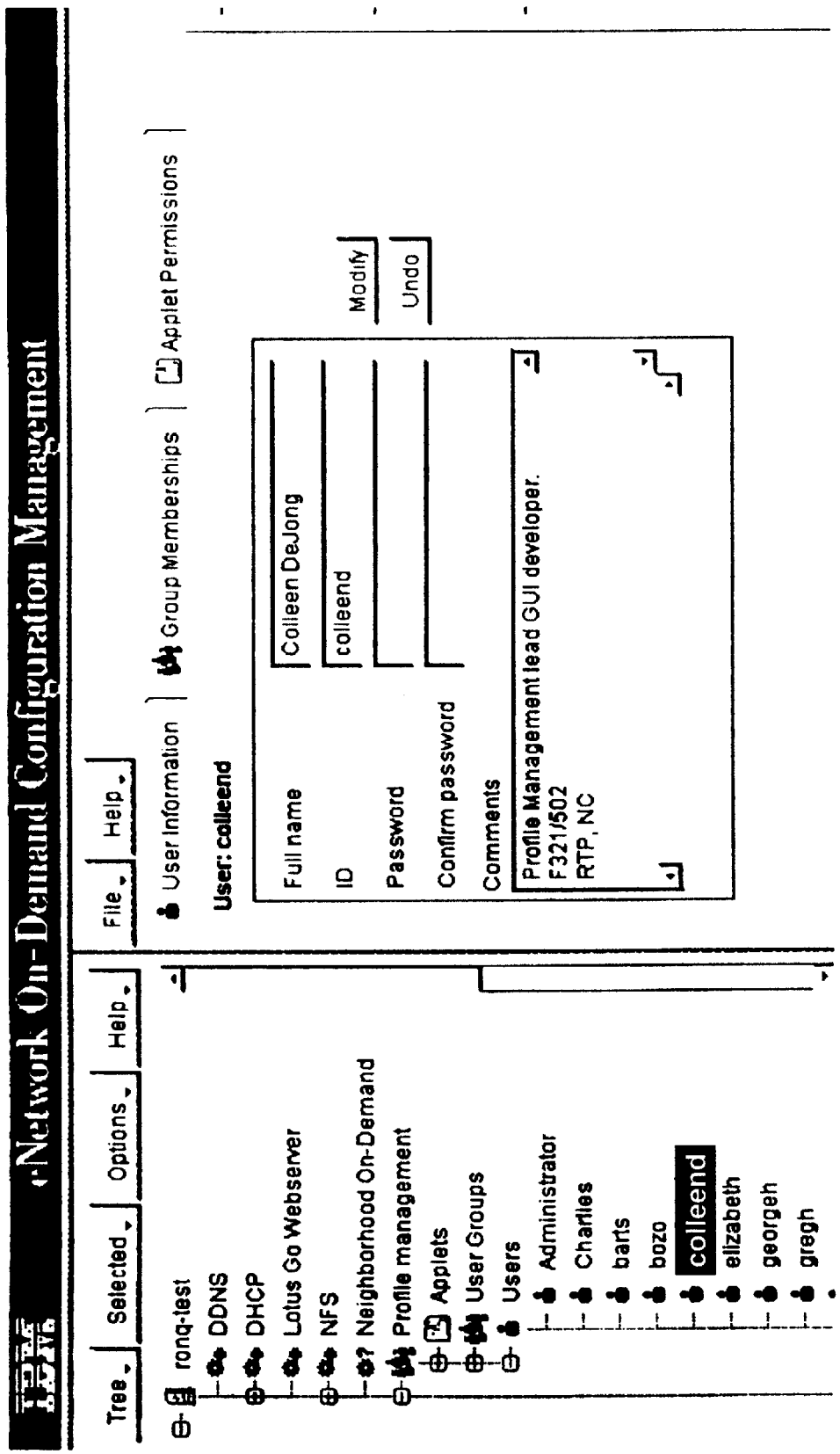

In FIG. 21, the administrator wishes to work directly on information corresponding to a user whose ID is "colleend". To do this the administrator expands "Users" in the left panel of FIG. 21, for example, and then selects "colleend", as shown. The right panel then appears, which is devoted to colleend's system information. The right panel contains three tabs. The first tab "User Information" is selected by default. In this tab, the administrator can modify the name, ID, password and comments pertaining to colleend.

Figure 22:
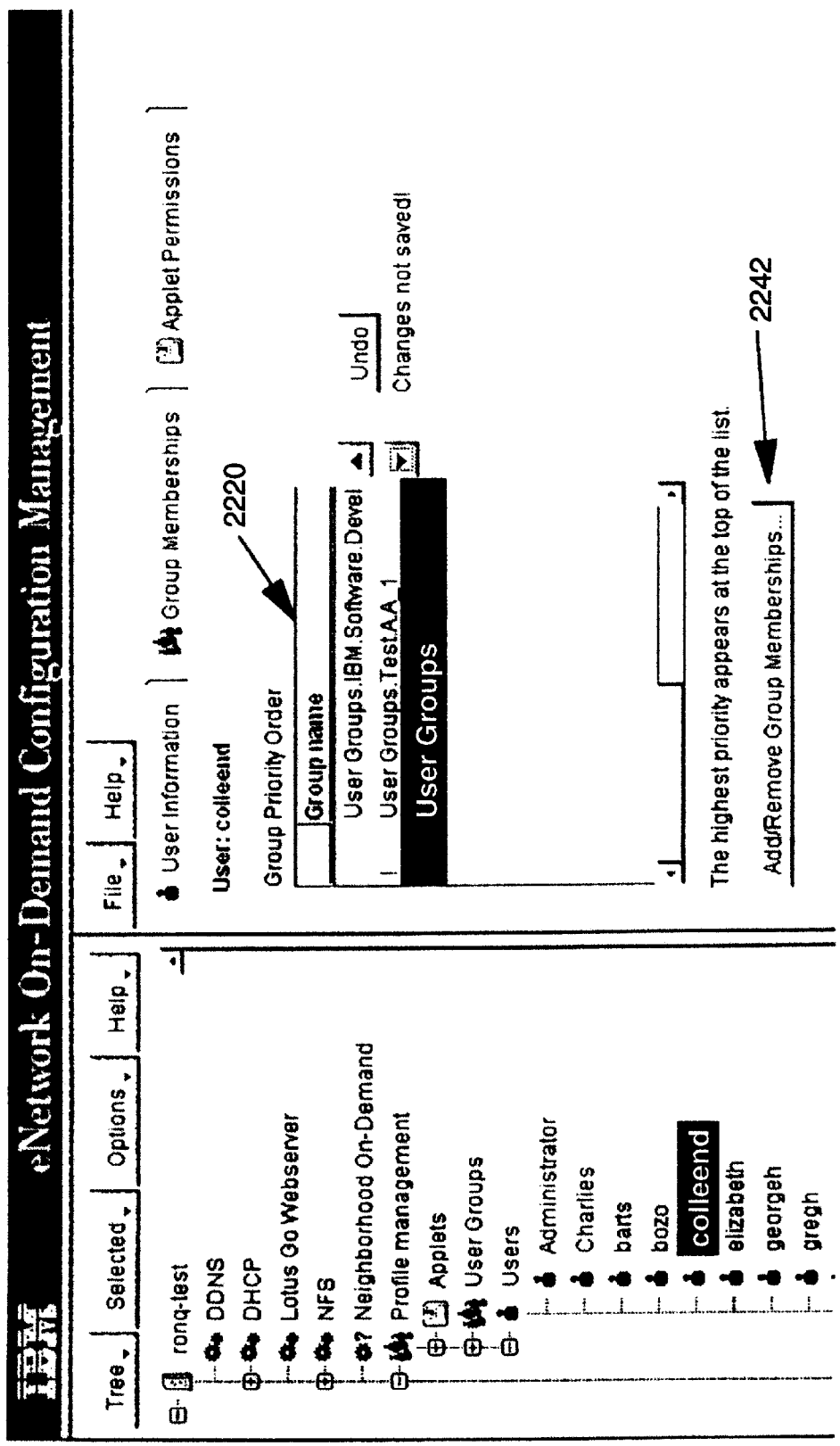
Figure 23:
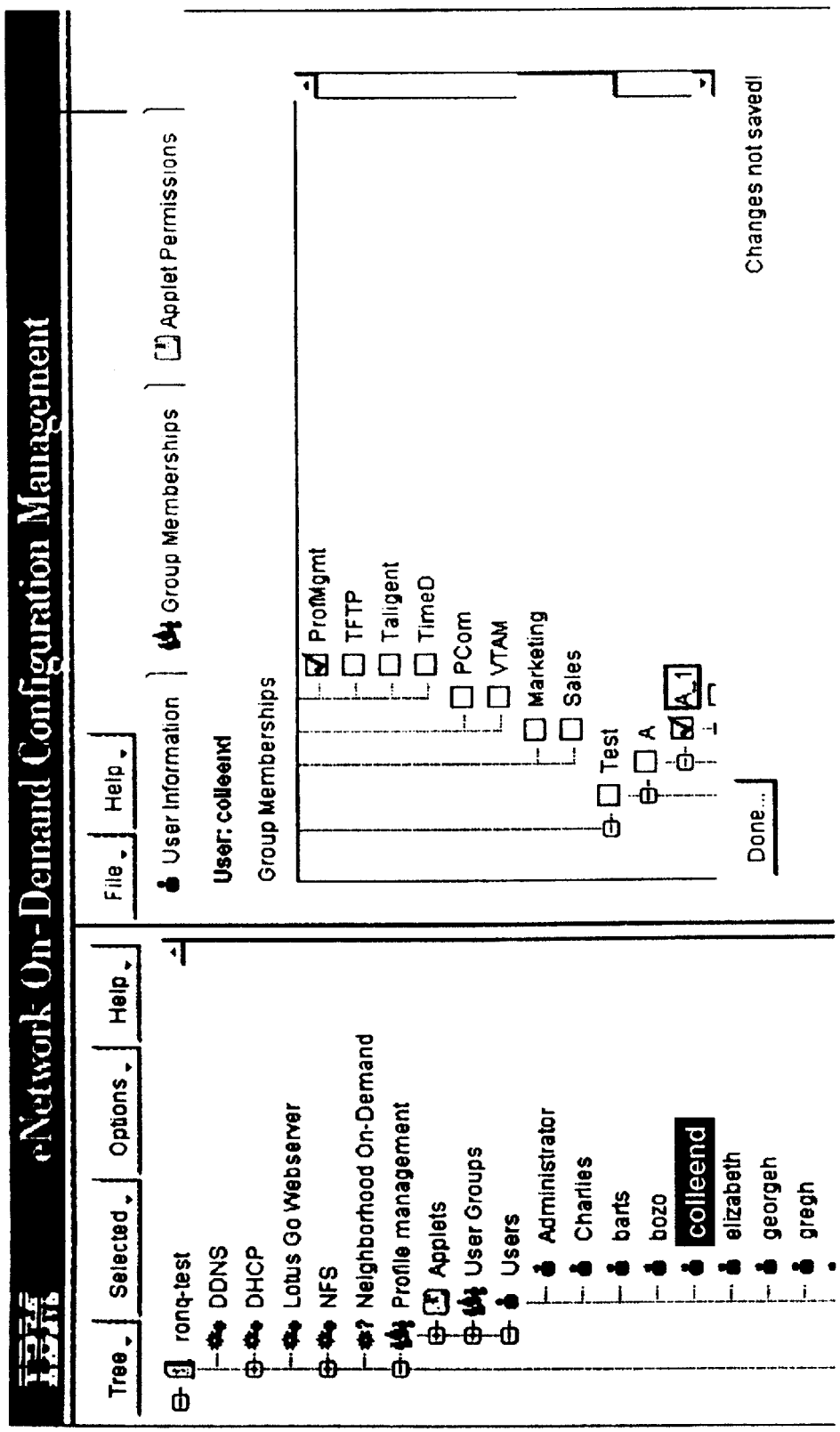

FIG. 22 shows the right panel when the administrator selects the second tab "Group Memberships". List 2220 shows all subgroups of which colleend is a member. The subgroups are shown in this list in the order of subgroup priority for colleend. The administrator can change colleend's subgroup priority by selecting a subgroup and using the up and down arrows to the right of list 2220 to move the selected subgroup up or down the list as desired. If the administrator clicks the "Add/Remode Group Memberships" button 2242 in FIG. 22, the right panel then shows the contents of FIG. 23. The FIG. 23 right panel allows the administrator to modify the subgroups of which colleend is a member. The administrator does this by clicking on an appropriate box corresponding to a desired subgroup. If the box is clear (meaning that colleend is not presently a member), then a check mark is added to the box to include colleend in the subgroup. Conversely, if a subgroup box is already checked, then clicking on the box clears the check mark and removes colleend from the subgroup.

Figure 24:
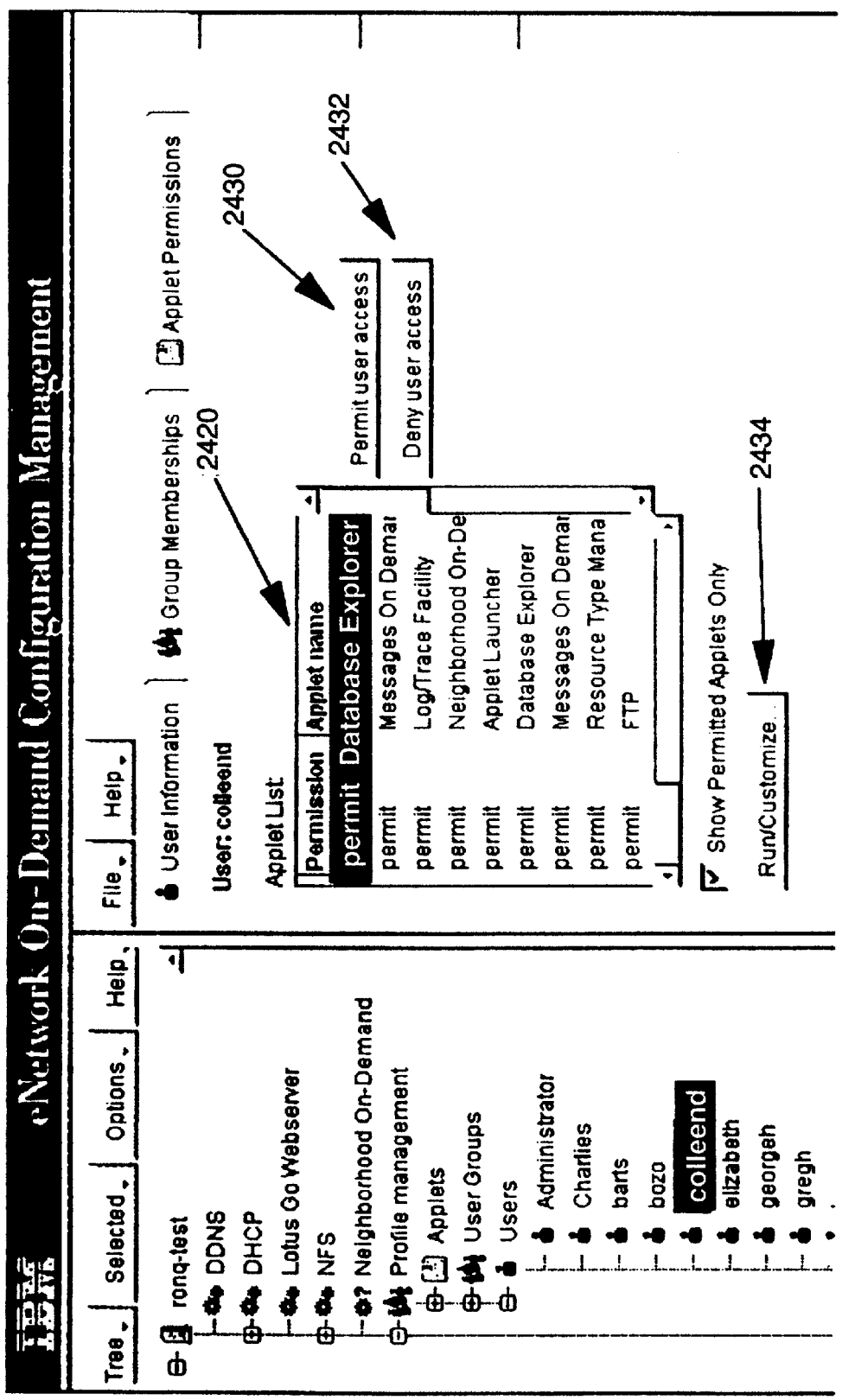

FIG. 24 shows the right panel when the Applet Permissions tab of FIG. 22 is selected by the administrator. In this right panel, list 2420 displays all applets that are defined in the system. The administrator can permit access by colleend to an applet by selecting the applet in list 2420 and then clicking the "Permit user access" button 2430; or access can be denied to colleend by clicking the "Deny user access button" 2432. The administrator can also launch an applet in the context of colleend by clicking the "Run/Customize" button 2434. When this is done, the applet selected in list 2420 is launched in the right panel. The administrator can then modify any preferences that the applet allows and save the preferences in the manner provided by the applet. A typical scenario here is for the administrator to launch a configuration applet then to fill in a variety of preference fields. However, if a separate configuration is not provided for a user applet, the administrator can launch the user applet in the context of a user and set preferences from the user applet. A typical scenario here is for the administrator to select a group or user context and then to launch the user applet as described above. The administrator can then typically modify preferences from an options menu and save them in any manner provided by the user applet. For example, typically, the user preferences are saved when the options dialogue is closed, or the user applet may provide other methods of saving the preferences. In any event, since the administrator is running the applet in the context of colleend in this example, the preferences set up by the administrator through the user applet are saved on the server as if colleend had entered them directly herself by running the applet.

Not shown in the figures is a scenario whereby a user can modify some preferences that pertain to a user applet. For example, a user applet may allow a user to select a window background color or fonts and font sizes, so that each system user can individualize the applet to some extent when the user applet executes on the users desktop. In this case, the user modified preferences are saved in the same way as they are when the administrator runs the user applet. One difference, however, is that the administrator can run user applets to set preferences in group contexts, whereas users can only affect preferences for their individual context.

It is to be understood that the above described arrangements are merely illustrative of the application of principles of the invention and that other arrangements may be devised by workers skilled in the art without departing from the spirit and scope of the invention.

We claim:

1. In a network system comprising a network interconnecting a server and a plurality of user stations, wherein the server stores a plurality of end user applications for downloading to user stations and further stores configuration preferences for the end user applications or stations, a method of retrofitting non-native stations or non-native applications into the system for central management, said method comprising providing a profile manager at an administrators station, arranging the profile manager to execute a configuration application for the non-native stations or applications, whereby the administrator can specify configuration preferences for non-native stations or applications in the context of different groups of system users, providing an export agent at the server corresponding to the configuration application, invoking the export agent when a request is made by the profile manager to store preference information on the server for the non-native station or application, reformatting the preference information by the export agent into a format compatible with the non-native station or application, and storing the reformatted information in a location on the server known to the non-native station or application for direct access by the non-native station or application.

2. For use in a network system comprising a network interconnecting a server and a plurality of user stations, wherein the server stores a plurality of end user applications for downloading to user stations and further stores configuration preferences for the end user applications or stations, apparatus for retrofitting non-native stations or non-native applications into the system for central management, said method comprising a profile manager at an administrators station, means for arranging the profile manager to execute a configuration application for the non-native stations or applications, whereby the administrator can specify configuration preferences for non-native stations or applications in the context of different groups of system users, an export agent at the server corresponding to the configuration application, means for invoking the export agent when a request is made by the profile manager to store preference information on the server for the non-native station or application, means for reformatting the preference information by the export agent into a format compatible with the non-native station or application, and means for storing the reformatted information in a location on the server known to the non-native station or application for direct access by the non-native station or application.

3. A program product for retrofitting non-native user stations or non-native applications into a networked system, said system further comprising a network server for storing profile information for stations or applications, said product comprising a storage medium for storing program instructions executable by the server, said product further comprising a first code segment for implementing a profile manager at an administrators station, a second code segment for arranging the profile manager to execute a configuration application for the non-native stations or applications, a third code segment for providing an export agent at the server corresponding to the configuration application, a fourth code segment for invoking the export agent when a request is made by the profile manager to store preference information on the server for the non-native station or application, a fifth code segment for reformatting the preference information by the export agent into a format compatible with the non-native station or application, and a sixth code segment for storing the reformatted information in a location on the server known to the non-native station or application for direct access by the non-native terminal or application.

4. A computer data signal embodied in a carrier wave comprising computer instructions for retrofitting non-native user stations or non-native applications into a networked system, said system further comprising a network server for storing profile information for stations or applications and for executing said instructions, said computer instructions further comprising a first code segment for implementing a profile manager at an administrators station, a second code segment for arranging the profile manager to execute a configuration application for the non-native stations or applications, a third code segment for providing an export agent at the server corresponding to the configuration application, a fourth code segment for invoking the export agent when a request is made by the profile manager to store preference information on the server for the non-native station or application, a fifth code segment for reformatting the preference information by the export agent into a format compatible with the non-native terminal or application, and a sixth code segment for storing the reformatted information in a location on the server known to the non-native station or application for direct access by the non-native station or application.

* * * * *